United States Patent [19]

Cox et al.

[11] Patent Number: 5,192,566
[45] Date of Patent: Mar. 9, 1993

[54] WHOLE POULTRY EGG ANALOGUE COMPOSITION AND METHOD

[76] Inventors: James P. Cox; Jeanne M. Cox, both of 246 E. Bartlett Rd., Lynden, Wash. 98264

[21] Appl. No.: 588,517

[22] Filed: Sep. 21, 1990

Related U.S. Application Data

[63] Continuation of Ser. No. 348,310, May 5, 1989, abandoned, which is a continuation-in-part of Ser. No. 190,885, May 6, 1988, abandoned.

[51] Int. Cl.⁵ .............................. A23L 1/32; A23P 1/12
[52] U.S. Cl. .................................... 428/89; 426/104; 426/276; 426/512; 426/515; 426/573; 426/575; 426/614
[58] Field of Search ................. 426/89, 104, 276, 573, 426/575, 512, 515, 614

[56] References Cited

U.S. PATENT DOCUMENTS

| | | | |
|---|---|---|---|
| 3,640,732 | 2/1972 | Johnson | 426/535 |
| 3,769,404 | 10/1973 | Latham | 426/614 |
| 3,864,500 | 2/1975 | Lynn | 426/614 |
| 3,911,144 | 10/1975 | Strong et al. | 426/588 |
| 3,941,892 | 3/1976 | Glosser et al. | 426/104 |
| 3,987,212 | 10/1976 | Seeley et al. | 426/614 |
| 4,046,922 | 9/1977 | Burkwall, Jr. | 426/104 |
| 4,103,040 | 7/1978 | Fioriti et al. | 426/614 |
| 4,120,986 | 10/1978 | Lynn | 426/549 |
| 4,362,748 | 12/1982 | Cox | 426/1 |
| 4,469,475 | 9/1984 | Krysiak | 425/132 |
| 4,702,921 | 10/1987 | Ueda | 426/48 |

Primary Examiner—Donald E. Czaja
Assistant Examiner—Evan Federman
Attorney, Agent, or Firm—Hughes & Multer

[57] ABSTRACT

A whole egg analogue is disclosed wherein a yolk analogue is treated to form a membrane on its outer surface. The yolk analogue with its attendant membrane is combined with natural egg white, treated egg white or an egg white analogue to form the whole egg analogue.

54 Claims, 4 Drawing Sheets

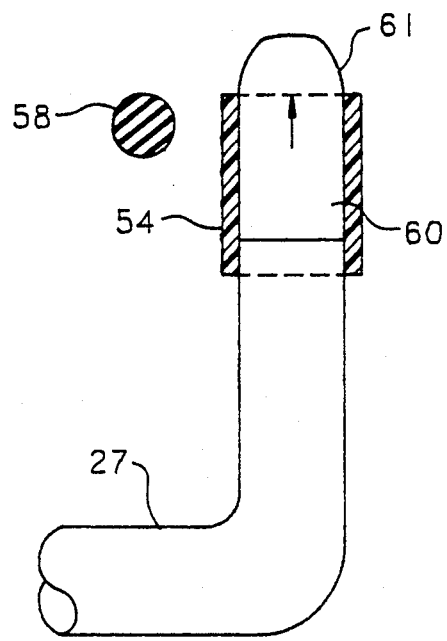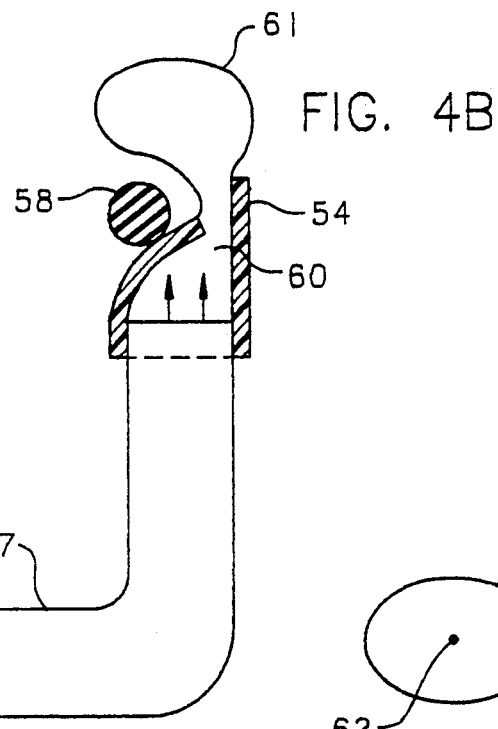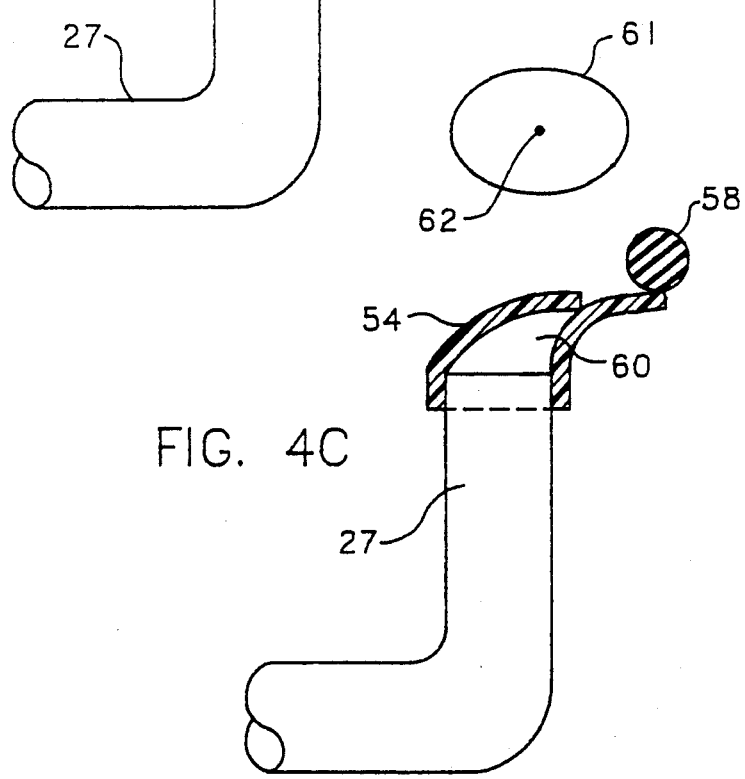

WHOLE POULTRY EGG ANALOGUE COMPOSITION AND METHOD

CROSS REFERENCE TO RELATED APPLICATIONS

This application is a continuation-in-part of application Ser. No. 348,310 filed May 5, 1989, and now abandoned.190,885, filed May 6, 1988, and which is a continuation-in-part of U.S. application Ser. No. 190,885, filed May 6, 1988, now abandoned.

BACKGROUND OF THE INVENTION

1. Technical Field

The present invention relates generally to edible food products, and, more particularly, to analogues of edible natural fresh whole poultry eggs and methods of manufacturing the same.

More specifically, the present invention relates to edible natural fresh whole poultry egg analogue products which can be used with equal facility and can substantially duplicate the results, both nutritionally and in terms of cooking characteristics and/or organoleptic properties of a natural poultry egg These characteristics and properties are irrespective of whether the egg analogue of this invention is hard boiled, soft boiled, scrambled, fried either "sunny-side up" or "over easy", basted, poached, or used as a component ingredient of another food product.

The whole poultry egg analogue products provided by this invention comprise a synthetic egg with three basic parts; i.e., a yolk surrounded by a vitelline membrane and a white. This invention also includes egg analogues comprised of a yolk encased in a synthetic membrane.

The egg analogue of this invention may be formulated to improve, change or compensate for certain undesirable components or fractions inherently present in natural fresh whole poultry eggs such as triglycerides, high-density lipids or cholesterol. The resulting analogue can be prepared employing the present invention to substantially approximate the appearance, consistency, cooking characteristics, taste and similar organoleptic properties of a natural, fresh whole poultry egg product.

For example, when the yolk analogue (hereinafter referred to as the "yolk") is man-made, the product can be engineered to be "cholesterol free" or, if desired, its cholesterol content can be established at any desired reduced level. Moreover, the calorie content of the egg can be significantly reduced to contain, for example, one-third or less, of the calories contained within a natural egg.

BACKGROUND OF THE INVENTION

Unfortunately, natural fresh whole poultry eggs are known to be high in triglycerides, high density lipids and, particularly, cholesterol. Because of these components and their adverse effects on the human cardiovascular system, persons at high risk of cardiovascular disease have a continuing need for careful dietary control of the types of foods consumed.

Natural fresh whole poultry eggs are known to be prone to bacterial contamination and have been implicated in many cases of food poisoning. Pasteurization and/or thermostabilization of natural eggs has simply not been an available solution to the problem since such process treatments of natural whole poultry eggs serve to break down the white of the egg, causing it to become thin and runny, and causing the egg to appear old rather than fresh.

As a consequence of the foregoing problems and the increasing awareness thereof by the consuming public, the per capita consumption of fresh whole poultry eggs has decreased significantly over the years. Another factor which has contributed to the decline in egg consumption is changing lifestyle. There appears to be an increasing tendency to consume fast foods and/or microwavable foods. Natural whole fresh poultry eggs are simply not the answer to this type of food demand. They are not readily microwavable, and they do not lend themselves to inclusion in microwavable frozen meals, whether for breakfast or otherwise.

There now exists a wide disparity in the demand for egg yolks versus egg whites. At the present time, and for some time in the past, natural egg yolks have sold at a premium price, while natural egg whites have sold at a depressed price. A consumer-acceptable egg analogue employing natural egg whites could increase the demand for natural egg whites.

Indeed, even where the consumer may be at low risk and may have no concern about the cholesterol or possible bacterial contamination of the natural fresh whole poultry egg, the high food value and fat content render the product high in calories relative to its weight, a factor which has further depressed consumption.

Notwithstanding the processing problems, health problems and ever-increasing concern of the consuming public, the natural fresh whole egg is, in other respects, an ideal foodstuff. The natural fresh whole poultry egg is inexpensive; its protein content is widely used as a standard of protein excellence and is assigned a protein value of 100 as compared to other protein substances which measure less; it is versatile, and, it is easy to prepare. In short, the natural fresh whole poultry egg is a delicious food product which is missed by many consumers who have either had to give it up entirely or limit their intake in an attempt to avoid or minimize health problems thought to be related to its triglyceride, lipid and cholesterol contents.

Numerous U.S. patents address aspects of artificial eggs. However, none of these patents discloses the composition described herein, or a composition having the versatility of the invention described herein.

Glasser et. al., U.S. Patent 3,941,892 discloses a sunny-side up simulated egg product, which may be cholesterol-free, that is frozen in a molded state to simulate a natural egg fried sunny-side up. This product is prepared for consumption by simply removing it from the freezer and heating to prepare a simulated sunny-side up egg product.

Johnson, U.S. Pat. 3,640,732 discloses a simulated egg which approximates a boiled, poached or fried egg. The yolk material is poured into spherical molds (yolk size) to gel. The yolk material gels to simulate a yolk.

Lynn, U.S. Pat. 3,864,500 discloses an egg yolk substitute prepared by combining a non-elastic protein material, oil and salt, simmering at a low temperature and adding a mild acid during continued heating to bring out its flavor characteristics. Water, vegetables, non-elastic protein material and a thickening agent are added with continued boiling. The composition is emulsified and a milk derivative protein is added to form the yolk substitute. The simulated yolk is used as a baking aid, such as in the preparation of cookies, layer cakes, bread and the like.

Burkwall, Jr., U.S. Pat. 4,046,922 discloses a simulated egg, which contains egg solids, a water absorbing hydrocolloid, a protein binder, water and sugar or a sugar equivalent. The product is shaped in the form of a rounded disk having an inner yellow colored portion and an outer white-colored portion.

Fioriti, et. al., U.S. Pat. 4,103,040 discloses a low cholesterol egg product wherein a wet egg yolk is combined with edible oil by high energy, high sheer mixing. Cholesterol is extracted from the yolk by the oil. The yolk is then separated from the oil and the cholesterol-free yolk material is incorporated into various egg products.

Lynn, U.S. patent 4,120,986 discloses a whole egg replacer which is prepared by combining a nonelastic protein material, oil and salt, heating the mixture at a low temperature, and adding a mild acid to enhance the flavor characteristics.

None of the references discloses, teaches or otherwise provides for a versatile whole egg analogue such as is described herein.

Consequently, it is one object at the present invention to provide a whole egg analogue which is substantially the same in appearance, taste and preparation characteristics as a whole fresh poultry egg.

A further object is to provide a poultry egg analogue which is nutritionally improved over a natural poultry egg, such as by containing fewer calories, higher vitamin levels and the like.

An additional object is to provide a poultry egg analogue which contains reduced quantities of lipid components, such as cholesterol, low or high density lipoproteins and triglycerides when compared to a natural poultry egg.

A further object of the present invention is to provide a poultry egg analogue which is free of blood spots, partially developed embryos and other disagreeable organic matter.

Another object of the present invention is to provide a poultry analogue in which the white and yolk are separated by a continuous and integral membrane.

Another object of the present invention is to provide a whole poultry egg analogue which may be frozen and which is readily microwavable.

Another object of the present invention is to provide a poultry egg analogue which may be rendered bacteriologically safe as compared to natural poultry eggs and other egg products.

Another object of the present invention is to provide a poultry egg analogue which may contain dietary fiber or nutritional supplements as previously described.

It is a further object of this invention to provide methods for making poultry egg analogues and methods for preparing cooked egg dishes from the egg analogues of this invention.

BRIEF DESCRIPTION OF THE DRAWINGS

These and other objects and advantages of the present invention will become more readily apparent upon reading the following Detailed Description and upon reference to the attached drawings in which:

FIGS. 4A through 4C are cross sectional side elevational views of the exemplary whole yolk/membrane forming apparatus shown in FIG. 3, depicting three (3) sequential stops indicating the formation of yolk/membrane analogues.

SUMMARY OF THE INVENTION

A poultry egg yolk analogue is disclosed comprising an edible liquid yolk material contained within an edible, synthesized membrane.

The yolk analogue described above may be combined with natural egg white, treated egg white or an edible white analogue to form a whole egg analogue.

The invention described herein further comprises methods of forming a whole poultry egg yolk analogue which includes the step of forming a synthetic membrane about a natural or synthetic yolk, preferably such that the membrane contains the yolk in substantially a generally spheroidal shape, like a natural egg.

The invention described herein further includes a method of forming a whole egg analogue, wherein the yolk analogue is added to a predetermined quantity of natural egg white or an egg white analogue.

DETAILED DESCRIPTION OF THE INVENTION

Figure 1:
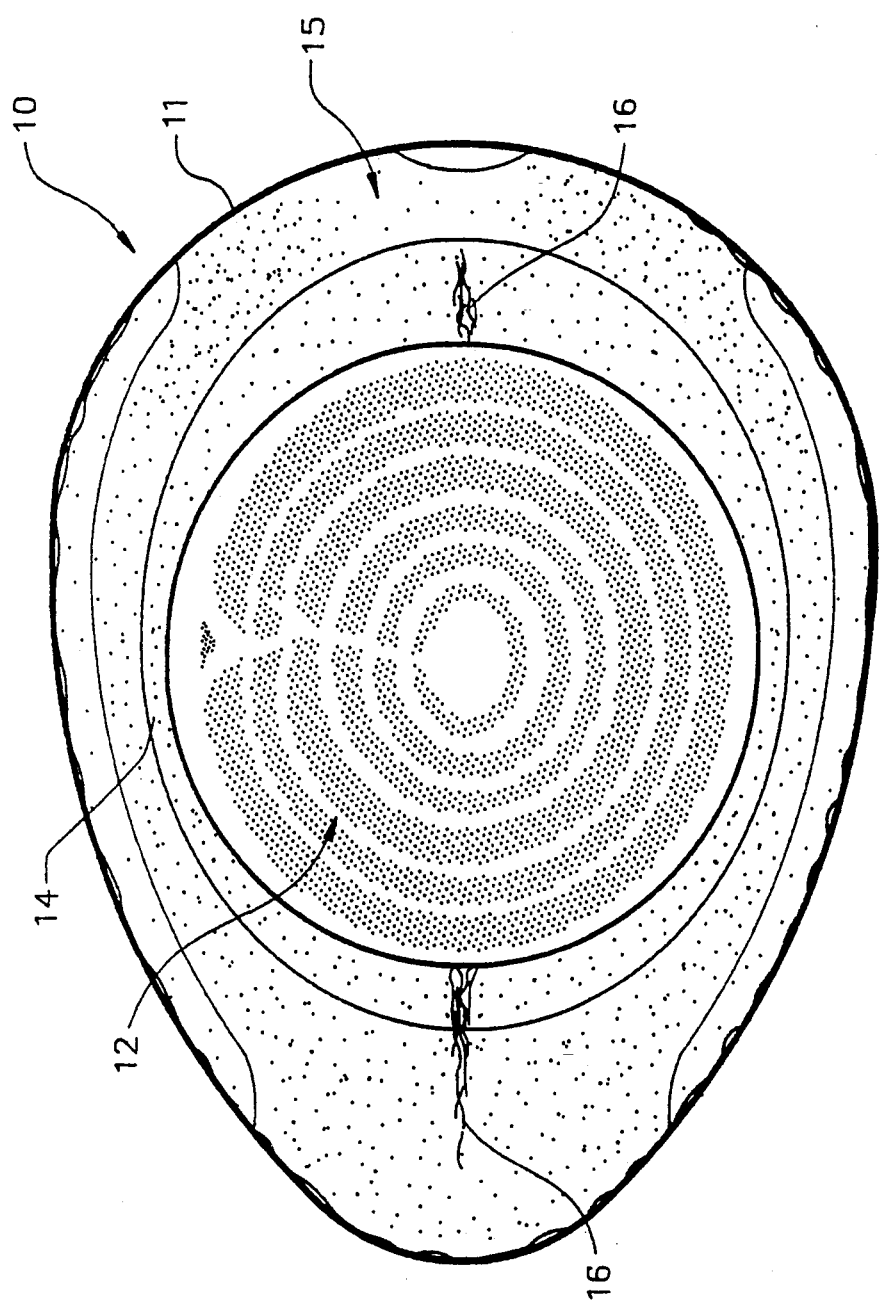
FIG. 1 is a cross-sectional diagram of a conventional natural fresh whole poultry egg, depicting the various structural components.

Referring to FIG. 1, a cross-sectional rendering has been set forth depicting the structural components of a natural whole poultry egg, generally indicated at 10, with the liquid components of the natural uncooked egg being contained within an outer eggshell 11. Excluding the outer eggshell 11, a natural whole uncooked poultry egg is an integral, composite, basically liquid unit comprising three components—viz., i) a liquid yolk, generally indicated at 12, which, although primarily yellow in color actually consists of alternate yellow and white layers; ii) a relatively thin, strong, liquid impervious membrane 14 surrounding and totally enveloping the liquid yolk material 12; and iii), a plurality of liquid, viscous albumen layers, commonly referred to as the egg white, here generally indicated at 15. In a natural poultry egg, the vitelline membrane 14 serves two (2) important functions—viz., i) it contains liquid yolk material 12 in a slightly oval, generally spheroidal shape; and ii), it serves to physically attach the liquid yolk material 12 to the surrounding liquid white material 15 at the interface therebetween.

Absent such a membrane 14 the liquid yolk would simply lose its shape and flatten out, spreading over the liquid white material 15 in much the same manner as when the membrane is inadvertently ruptured. Moreover, absent the membrane's ability to physically attach itself to the liquid white material at the interface therebetween, the yolk would simply slide across the surface of the liquid white when placed into a skillet, with the yolk 12 and white 15 becoming separated and residing on different portions of the skillet surface.

In carrying out the present invention, the synthesis of a membrane analogue ("membrane") is important in that it surrounds and encapsulates the liquid yolk analogue material; attaches the liquid yolk material to the liquid white material, and whites over when cooked, thereby forming a composite, whole poultry egg analogue.

As used herein, the terms "synthetic" and "synthesized" refer to a membrane which is formed to encapsulate the yolk material, but are not intended to imply that synthetic or artificial ingredients need to be included.

A preferred liquid yolk material contains as basic components one or more flavorants, one or more viscosity building agents or thickeners, an aqueous liquid and an oil or fat. The flavorant contained within the liquid yolk material may be any useful poultry flavorant which is effective for imparting to the liquid yolk material a poultry flavor. Examples include chicken broth as well as other natural and artificial flavorants. One preferred poultry flavorant is chicken broth, which may ideally have a low sodium content. When chicken broth is included in the formulation, it may also serve as the aqueous component of the yolk formulation.

Chicken broth may be present, for instance, in an amount ranging from about 5 to about 95 percent of the yolk formulation, preferably about 50 to about 80 percent, and most preferably about 60 to 65 percent. Unless otherwise specified, all percentages herein are given on a weight basis.

Substitutes for chicken broth flavoring include hydrolyzed plant protein having a chicken-like flavor, chicken meat and treated egg white. Other generally non-nutritive flavoring components which are sometimes useful include Artificial Egg Flavor, IPC No. 13531023, Natural Egg Flavor, Spray Dried (I.F.F.); Natural Egg Type Flavor, sample no. 9473 (Fritzsche, Dodge & Olcott); Felton Natural Egg Flavor, Water Soluble, PN No. 499715; Felton Yolk Flavor, PN No. 401620; and Alex Fries Artificial Egg Yolk Flavor, no. 83-233.

Additionally, small portions of an organic acid may be included to enhance the egg taste and flavor. For example, lactic acid and/or citric acid may be included and have a flavor enhancing effect.

The quantity of flavorant contained in the yolk formulation will depend on taste desires and largely upon the particular flavorant used. Such non-chicken broth flavorings may be present in any suitable amount, for example, amounts ranging from about 0.001% to about 10.0%, and preferably from about 0.01% to about 5.0% of the yolk formulation.

Fats and oils are useful for incorporating into the yolk formulation, and include a wide variety of edible oils and fats useful for building the desired consistency and for imparting the desired mouth feel to the yolk formulation when it is eaten. These are optional ingredients which preferably will be present in amounts up to about 50 percent of the yolk. Margarine contains a variety of such fats, and is particularly useful in that it presents additional flavorant ingredients, such as 2,3-butanedione. Margarine may be present in the yolk formulation in an amount ranging from, for instance, about 5.0 to about 50.0 percent, and preferably comprises about 15.0 to about 30.0 percent of the yolk formulation. Safflower and corn oil margarines are the preferred margarine types.

Alternatively, a no cholesterol or low cholesterol oil may be used to enhance the flavor, texture, mouth feel or use in baking as appropriate. Preferred oils which are useful include partially hydrogenated corn oil, vegetable oil, safflower oil and coconut oil. Highly unsaturated fats or oils having an iodine value of over 100 are preferred. The oil may be present, for example, in an amount ranging from about 8 to about 25, and preferably about 10.0 to about 15.0 percent of the yolk formulation. Vegetable oils are preferred to cholesterol-containing oils, since one of the primary objectives is to produce an egg analogue which has little or no cholesterol.

Alternatively, the yolk may contain a dairy fat, such as butter, if the cholesterol content of the whole egg analogue is not critical.

The selection of the particular oil or fat or mixture thereof for the yolk formulation, or mixtures thereof, can effect the viscosity of the yolk analogue in its pre-cooked as well as its cooked condition. Hence, more fluid fats and oils may be selected to minimize the viscosity of the yolk material, and more saturated fats and heavy oils may be selected when a higher viscosity yolk material is desired.

Water (which may be part of the broth) is also optionally incorporated into the formulation. The preferred form of aqueous material contained in the yolk formulation when chicken broth is not used is deionized water in an amount ranging from about 5 to about 90, and preferably about 50 to 85 percent of the yolk formulation. Water is included to adjust the viscosity and impart the proper texture to the yolk analogue.

Proteins may optionally be used in the yolk formulation including globular proteins such as albumen, ovalbumin, cooked meat (which may be blended and dried), glycoproteins, myosins, globins, caseins, zein and the like. Such proteins may be present in amounts, for example, ranging from about 0 to about 90 percent, and when present, preferably comprise about 2 to about 10 percent of the yolk formulation. The protein may be treated with a denaturant if necessary. One example of a suitable denaturant is ammonium hydroxide which may be present in an amount ranging from about 0.01 to about 5.0 percent based on the protein content.

When a generally higher protein content is desired, natural egg white can be included in the yolk formulation. When used in the form of natural egg white, it can, for example, form up to about 90 percent of the yolk formulation.

Other non-albumenous forms of protein may be included in the yolk formulation. Examples include meat as well as non-meat proteins, e.g., chicken meat, fish and soy protein. These other non-albumenous protein sources may comprise, for example, up to about 90 percent of the yolk formulation, and when present, preferably comprise about 2.0 to 4.0 percent of the yolk formulation.

Various viscosity control agents, thickeners, emulsifiers, gel forming substances, gums and the like may also be included in the yolk formulation. Some of these agents may be in the form of hydrocolloids, and are generally useful for emulsifying the oil/fat and the water components or building the viscosity of the egg yolk material to simulate the texture and viscosity of natural yolk material. Many gums and gum-like substances are also useful for at least partially forming a membrane which encapsulates the yolk material. As such, these compounds may act as film-formers, thickeners, viscosity builders, etc. These gums and gum-like substances also act as primary components in the membrane system when desired, and assist in membrane attachment to the egg white material, white-over upon cooking, and impart durability to the yolk. Various combinations of these gums may be used to approach the desired texture and consistency of the yolk formulation and to form the membrane surrounding the yolk material.

The preferred gums and gum-like ingredients, and in particular, alginates, pectin, locust bean gum, tragacanth and carageenan may be present, for example, in an amount ranging from about 0.2 to about 10.0, and preferably about 2.0 to about 6.0 percent of the yolk formulation.

The preferred alginates include alginate salts such as sodium alginate and, in particular, sodium alginate low viscosity ("LV") and sodium alginate high viscosity ("HV"). These alginates may be present, for example, in amounts ranging from about 0.5 percent to about 5.0 percent of the yolk formulation, and preferably comprise about 0.75 to about 3.0 percent of the yolk formulation.

The acacias, pectins, locust bean gums, tragacanths, carageenans, xanthans, ghatti, tara, curdlan, dextran, glycan, scleroglucan, pullulan, elsinan, furcelleran, amylose, chitin, chitinose, flaxseed, fucoidan, gellan, laminarian, larch, okra, quince seed, tamarind, Y-1401, Y-2448, zanflo and karayas are also useful for imparting the desired viscosity, as well as contributing to the integrity of the membrane. These gums may be included singly, in combination with the algin, or in combination with each other in any amount, for example, up to about 3 percent. The total amount of gums present in the yolk formulation would typically not exceed about 10 to 15 percent.

Starches and starch-like substances which may act as fillers or thickeners in the yolk formulation include corn starch, modified food starches and the like. These optional additives may thicken on heating to form various degrees of cooked yolk appearance, while imparting a smooth texture to the yolk material when uncooked. These compounds may be present in an amount ranging from, for example, about 0.5 percent to about 10.0 percent of the yolk formulation. Alternative starch-like ingredients include, for example, rice flour, dextrin, tapioca, potato, sodium carboxymethylcellulose, methylcellulose, hydroxyethylcellulose, hydroxypropylcellulose hydroxypropylmethylcellulose, P.S.-60, P.S.-7, Polysaccharide B-1973, and hydroxypropyl starch acetate, which may be included in various amounts.

The gelatin and gelatin-like substances optionally included in the yolk formulation are used as viscosity-building agents and yolk gelling agents, and impart a characteristic mouth feel to the yolk analogue upon consumption. Preferred gelatin-like substances include collagen, as well as gelatin, about 50 bloom to about 350 bloom, preferably 300 bloom. Gelatin and gelatin-like substances may be present, for example, in amounts, ranging up to about 15.0 percent, and when included are preferably about 1 percent.

Alternatives to gelatin which may optionally be used include agar and gluten. When present, these agents preferably comprise in the range of about 1 percent of the yolk.

Also included in the yolk formulation may be lecithin, which is preferably a non-cholesterolized lecithin. Lecithin is useful as an emulsifying agent. Examples of non-cholesterolized lecithin include lecithins derived from plant origin, such as soy lecithin. Lecithin may be present in an amount, for example, ranging up to about 5 percent.

A metal ion-releasing salt may be incorporated to facilitate any necessary adjustments of the protein and to control any reaction involving the hydrocolloid. The ions contained in such salt may be useful for setting the various thickeners contained in the yolk formulation. Hence, the preferred cation is calcium, but iron and aluminum are also operative. As will be appreciated, the quantity of cation will effect the extent of gellation which occurs in the yolk prior to and during manufacture and cooking.

Certain of these metal-ion releasing salts are heat-sensitive, and therefore may also be included to give additional firmness to the yolk upon cooking. Examples include the calcium salts, such as carbonate, citrate, tartrate, lactate and the like. These optional metal salts may be present, for example, up to about 1 percent.

The yolk formulation may further optionally contain a small proportion of a sequestering agent believed to aid in controlling yolk firmness. Examples of such sequestering agents include citric acid, salts thereof, ethylenediaminetetraacetic acid ("EDTA"), polyphosphates, such as sodium hexametaphosphate, and certain magnesium salts which may be present in an amount ranging from, for example, up to about 1.0% of the yolk formulation.

When a sequestering agent is incorporated into the yolk formulation, it may also be advantageous to include a mild edible acid. The acid is helpful since it at least partially overcomes the sequestering agent as the temperature increases during cooking. This is believed to facilitate the release of metal ions by dissociation of the metal ion-containing salt. One preferred mild acid is lactic acid, preferred because it contributes a poultry flavor to the yolk analogue.

The yolk formulation may also include an optional fermentative gas-producing compound, such as a sugar, which generates $CO_2$ upon fermentation in the presence of anerobic pathogens, e.g. clostridium. The ingredient may be useful to indicate bacterial contamination if it occurs. When used, it may comprise up to, for example, about 5 percent of the yolk formulation.

The yolk formulation may further contain an optional deaerating agent, such as a silicone, which is useful for eliminating any foam which is otherwise generated during blending of the components.

One or more appropriate coloring agents may be included in the yolk formulation to impart to the yolk a finished orange-yellow appearance. One example of a preferred coloring agent is beta-carotene, but other coloring agents are acceptable, such as annato, F,D & C Yellow No. 5, and the like.

To prepare the yolk formulation, the appropriate ingredients are combined and blended. After blending, the yolk material may be immobilized in a yolk-like, spherical shape, such as by molding and/or freezing. The frozen or otherwise immobilized material may then have a membrane forming solution or dispersion coated onto its outer surface.

The membrane forming solution or dispersion may contain one or more edible hydrocolloids, such as sodium alginate; a combination of membrane forming agents, such as carboxymethylcellulose and guar gum, or a modified food starch, such as a pre-dextrinized rice flour or a treated protein. The yolk analogue, with a membrane solution on its surface, may then be treated to form the membrane by contact with a reactive composition in the form of a vapor or setting bath.

The yolk material can be prepared so that it will harden through as it is heated, or so that it will stay soft when heated, depending on the desired specifications.

For example, by using a high concentration of gelatin in the yolk formulation, the yolk analogue will be perceived as firmer when chilled, and may become less firm when heated. Similarly, by increasing the quantity of setting ions in the setting bath, or by using a low concentration of a sequestering agent, the yolk analogue may be perceived as firmer setting than would otherwise be the case.

Alternatively, by including a low concentration of setting ions in the setting bath, or by increasing the sequestering agent concentration in the yolk formulation, a softer or "runny" yolk is possible.

Alginates are optional membrane solution components, particularly useful for forming the membrane. Such alginates may be present in any desired amount effective for forming the membrane, e.g., about 0 to about 10 percent. The preferred alginates are salts, such as sodium.

The membrane solution may include at least one proteinaceous material such as albumen, solubilized meat, fish, dairy or vegetable protein, alone, in combination or taken together with one or more reactive hydrocolloids such as sodium alginate, locust bean gum, carrageenan, carboxymethylcellulose and the like. The proteinaceous material and a hydrocolloid where combined are preferably in a solution which can be: i) applied to the surface of a frozen yolk analogue and exposed to a setting solution; ii) coextruded about the surface of an extruded yolk analogue and exposed to a setting solution; or iii) included in the liquid yolk material and extruded into a setting bath. As previously stated, where one or more of the membrane forming ingredients are heat responsive (e.g., proteinaceous materials) the setting bath may be heated to about 120° F. to about 200° F., preferably about 135° F. to 180° F. Alternatively, a plurality of successive baths—one at or about ambient temperature and one at elevated or reduced temperature may be used.

Suitable membrane ingredients may be selected from amongst the following categories:

Proteins, protein complexes and derivatives thereof, such as gluten; elastin; albumen; collagen; gelatin; fish, poultry, or other meat proteins; soy; zein; casein; whey; blood; enzymes such as pepsin, erepsin, rennin and peptides and amino acids such as cysteine, cystine and the like;

Polysaccharides, including carbohydrates, starches and hydrocolloids, such as sodium alginate, microbial alginate, chitin, chitinose, chitosan or other chitin derivatives, propyleneglycol alginate, pectin, amylopectin, sodium pectinate, low methoxyl pectins, gelatin, methylcellulose, carboxymethylhydroxypropylcellulose, hydroxypropylcellulose, ethylcellulose carboxymethylcellulose, hydroxyethylcellulose, hydroxypropylmethylcellulose, P.S.-60, Polysaccharide B-1973, and the like;

Gums such as guar, acacia, hydroxypropyl guar, amylose, carageenan, dextran, larch, okra, tamarind, carboxymethylhydroxypropyl guar, xanthan, ghatti, dextrin, locust bean, tragacanth, curdlan, Gelan, baker's yeast glycan and the like; and Modified food starches including dextrins, waxy corn and short grain rice, pregelatinized flour and the like lipids.

In a preferred membrane, sodium alginate reacts or cross-links with calcium or similar setting ions present in a setting bath, whether heated, cooled or otherwise, to form a cross-linked matrix-like membrane surrounding the liquid yolk material. Such a cross-linked, matrix-like alginate membrane is believed to also serve as a supporting matrix for one or more second membrane forming agents utilizing, for example, one or more proteins, proteinaceous hydrocolloids and/or reactive gums. When used by itself as the membrane forming agent, the alginate membrane may be relatively weak, and burst or break during cooking. By including a protein, or other ingredient and a cross-linking agent, a firmer membrane may be created, which is more resilient when subjected to heat during cooking of the egg analogue.

Reactive gums, such as locust bean gum, are highly desirable for use as part of this particular membrane forming system. Locust bean gum is a low viscosity material when placed in cold water, having a viscosity of approximately 200 centipoise (200 cP). When heated to approximately 140° F., locust bean gum becomes highly viscous and exhibits a viscosity of on the order of 3,500 cP (i.e., its viscosity increases by more than seventeen times).

Carrageenan, another suitable reactive gum, also tends to increase in viscosity when heated and then cooled, but, generally only by a factor of about 2:1. Carrageenan is a desirable reactive hydrocolloid gum because it is particularly reactive with proteins. Consequently, when present on or forming part of the surface of the membrane analogue the membrane tends to draw in and attach to the natural egg white or proteinaceous egg white analogue, causing the latter to thicken to the consistency of a natural fresh egg white, bunch up around the yolk, and fixedly attach itself to the membrane analogue surrounding the yolk.

Thus, one preferred membrane forming system for use in carrying out the invention includes protein as a component, such as albumen, natural egg white and/or a solubilized meat protein together with at least one reactive gum such as locust bean gum and/or carrageenan, used in conjunction with, for example, sodium alginate. When added to a heated setting bath the locust bean gum and/or carrageenan swell and become part of the membrane matrix. This serves to form a thin, but strong, liquid-impervious membrane analogue when used in combination with the alginate, surrounding and encapsulating the liquid yolk analogue.

Where carrageenan and/or locust bean gum and/or hydroxypropylmethylcellulose ("HPMC") is present on the exposed surface of the membrane analogue (whether part of the membrane forming ingredients or whether dusted thereon), the gum causes the membrane to contract about the liquid yolk material, bunch up at the interface therewith, and attach itself to the yolk.

Proteins such as albumen can be used by themselves to form the desired membrane where special circumstances dictate. In such an arrangement the protein selected is preferably heat coagulated, treated at a pH (past the protein's isoelectric point) to form a solution and then allowed to cool with removal of the treating agents so that it forms a membrane upon placement into a setting bath.

Preferably a protein or other strong membrane forming agent is contained in the membrane formulation to provide a membrane that is sufficiently tough to withstand cooking without spontaneous rupture thereof.

The preferred membrane forming ingredients are alginates and proteins used in combination with one or more gums and/or one or more polysaccharides.

A particularly preferred combination of membrane forming agents comprises albumen, sodium alginate and locust bean gum.

The protein containing membrane formulation may also contain optional denaturants particularly when used with membrane forming materials and composites thereof. Examples include primary, secondary and tertiary amines, ammonium hydroxide and selected salts and acids, such as dibasic sodium phosphate hydrochloric acid, lactic acid, pyruvic acid and the like. If the denaturant is ammonium hydroxide, it may be evaporated during membrane setting.

An alternative preferred membrane-forming system utilizes non-proteinaceous materials present in an amount effective for forming a membrane. One example is a combination of gums, semi-synthetic cellulose derivatives and an alginate, with or without a sequestering agent, and with or without a cross-linking agent present. For example, a combination of guar gum and sodium alginate provides a membrane-forming aqueous solution at concentrations under about 10 percent.

The membrane formulation may also contain optional plasticizers which make the membrane more flexible after exposure to the setting bath, such as glycerol, sorbitol and the like.

Antifoaming agents may also be included in the membrane forming compositions to prevent air entrapment. Examples include silicone oil, polyglycols and the like.

The membrane forming composition may include optional coloring agents to render the yolk containment membrane a color which simulates that of a natural yolk.

Water may be included in the membrane solution for imparting the desired viscosity to the membrane solution and for dissolving the water-soluble components. Depending on the levels of membrane-forming components, water can be present up to as high as about 98 percent of the membrane solution.

The setting bath or other treatment provided can be adjusted to the particular membrane forming components selected for use in accordance with the present invention. The setting bath solution is preferably aqueous in nature, and may contain one or more reactive compounds, e.g., calcium, in concentrations effective for setting or forming the membrane either from the membrane forming material to form a coating or from the yolk material itself. The preferred calcium compound is calcium chloride present in an amount ranging from about 0.1% to about 10.0%, e.g., about 0.7% of the bath. The bath may also contain one or more acids. Examples of suitable acids include hydrochloric and lactic acid, present in an amount ranging from about 0.1 to about 10.0%, e.g., about 0.7%. The membrane is formed by reaction of the bath acid and calcium ions with the membrane forming agents on the surface of the yolk material. This may include coagulating any protein available, or effective cross-linking of any polymer or gel forming material included in the membrane formulation.

The membrane setting bath may be contained in a tank and continuously recirculated as an aqueous setting bath, maintained at a temperature of approximately 120° F. to 80° F. and at a pH value of 6.2 to 6.5. The bath contains the setting agent or those setting agents required to interact with the membrane forming ingredients. Alternatively, one or more enzymes may be incorporated into the setting bath to form the membrane. Examples of such enzymes include proteolytic enzymes, such as pepsin, erepsin and the like.

When an enzyme setting bath is used to form the membrane, it is preferable to follow with a second bath useful for deactivating the enzyme, e.g., a scalding bath, with a relatively short residence time, e.g. about 10 seconds to about 2 minutes.

Alternatively, the yolk formulation itself may contain sufficient quantities of membrane forming compounds which react with the bath components to form a membrane at the outer surface of the yolk. Such yolk and membrane analogues can be fabricated by incorporating the membrane forming ingredients in the liquid yolk material and extruding the liquid yolk material as discrete globules into a setting bath. The globules are roughly comparable in volume to that of natural yolks. The bath contains suitable reactants which interact with the membrane forming ingredients in the liquid yolk to form a membrane at the surface of the yolk material, where that surface is in contact with the setting bath. The liquid yolk material within the formed membrane assumes a generally spheroidal configuration which appears to be substantially the same as a natural egg yolk.

The percentages of components used in a single extrusion formulation may be varied slightly from the previously described yolk and membrane formulations. Generally, the membrane or film-forming ingredient concentrations are increased in the yolk formulation, to provide an adequate concentration of membrane forming ingredients, to react with the setting bath and form a membrane around the outer surface of the yolk analogue. For example, if natural egg albumen is included in the single extrusion formula, it would be preferable to include a slightly higher concentration than in, for example, a comparatable dual extrusion formulation.

For ease and convenience of manufacture, it is preferable to include effective amounts of the membrane forming components in the yolk composition. The yolk is then treated to create the membrane on its outer surface rather than coating the yolk with the membrane forming composition in a separate step prior to exposure to the membrane setting bath.

As the yolk/membrane material is extruded into the setting bath in discrete globules, a membrane is formed surrounding the liquid yolk material as a result of a reaction between the membrane forming ingredients and calcium or another suitable ion or setting agents contained within the bath. The formed yolks and membranes are permitted to reside within the bath for a sufficient length of time—generally from about five to about twenty minutes—to insure that the membrane forming ingredient contained within the yolk forming material forms a thin, strong, liquid-impervious membrane surrounding the liquid yolk material. During this period within the bath, the liquid yolk tends to assume a generally spheroidal configuration, comparable to that of a natural yolk. A preferred time in the setting bath is about 8 to 15 minutes, for example, 10 minutes.

After carrying out this aspect of the invention, the discrete, soft, generally spheroidal formed yolk/membrane analogues may be rinsed to remove excess ions from the surface thereof. The yolk/membrane analogues may preferably be maintained for about ten to about twenty minutes in such a rinse, at any appropriate temperature. During this period of time, the liquid yolk- /membrane analogues may be allowed to rest on the bottom of the bath and, therefore, assume a generally ovoid yolk-shaped configuration having a flattened bottom, a shape comparable to that of a natural liquid egg yolk when placed on a flat surface.

The partially set liquid yolk/membrane analogues may be conveyed in any suitable manner to a second and even a third bath or rinsing operation as necessary. The temperature of these subsequent baths and rinsing operation may range from tepid to an ice water bath.

The yolk, including the membrane, may then be placed in and bonded to natural egg white or a synthetic egg white analogue appearing as an integral, well defined, round, glistening globule of the appropriate yellow to yellow-orange color when uncooked. The white portion may contain natural egg white, treated egg white or any other suitable component which will coagulate upon cooking to simulate natural egg white. Alternatives to natural egg white useful in the egg white portion of the composition include blood and whey albumen as well as any other source of edible albument, other protein containing components, such as uncooked fish jelly, and other transparent or semitransparent proteinaceous materials. Additionally, several polysaccharides may be used to form an egg white analogue which simulates natural white upon cooking. The selection of the components used in the egg white material is, therefore, based primarily on protein content and expense. The egg white material may be treated with any of the thickening agents, such as the gums and polysaccharides, to impart a characteristic viscosity to the egg white material which approximates that of natural egg white.

The outer surface of the membrane should bind relatively firmly to the egg white or egg white analogue during cooking. A binding agent may be added to the membrane formulation to facilitate binding between the yolk and the white. Suitable binding agents include powdered proteins, collagen, gluten and many gums and starch-like derivatives, which may be applied in several layers, dusted or coated thickly onto the outer membrane surface. Divalent or trivalent metal ions such as trivalent iron or aluminum also tend to bond the white to the yolk. Such materials may be included in the containment membrane formulation or added to the containment membrane setting fluid.

To prepare a treated egg white or an egg white analogue which appears fresh to the consumer, the membrane and the egg white material are preferably attached. Hence, an effective amount of a gum may be added to the egg white material or applied to the outer surface of the membrane. A preferred gum useful in this fashion is locust bean gum. A preferred polysaccharide binding agent useful for enhancing the appearance is hydroxypropymethylcellulose ("HPMC"). A preferred combination additive to treat natural egg white is a combination of locust bean gum and hydroxypropylmethyl cellulose HPMC.

A solution of gums, metal ions and/or phospholipids, such as acacia, carrageenan, locust bean gum and/or HPMC can be added to the egg white material itself—whether in addition to or in lieu of one or more of such ingredients on the surface of or incorporated in the membrane analogue per se—so as to produce thickening, bunching up of the egg white and attachment to the membrane. It is also possible to include polyvalent salts of aluminum, sodium, iron or copper to enhance attachment of the egg white material to the membrane. Examples include aluminum potassium sulfate, aluminum sulfate, ferrous sulfate, ferric sulfate, copper sulfate and copper gluconate in minor effective amounts.

Such additions, in amounts ranging from for example, about 0.0002 to about 0.05 percent, improve the fresh appearance of the egg white material. Depending upon the agents utilized, the durability of the egg white material may be improved in the presence of heat, e.g., pasteurization, such that the temperature at which the egg white component coagulate may be increased.

The locust bean gum, carageenan and HPMC may be combined in the form of a solution of each, for example, about 0.5 percent, and the solution may be added to natural egg white to form treated egg white.

In addition to this locust bean gum/carageenan/HPMC combination, a small amount of lecithin, preferably soy lecithin, may also be added to the natural egg white to enhance attachment to the membrane by the egg white. Preferably lecithin is added in an amount ranging from about 0.1% to 2.0%.

It may be preferable to apply a powdered binding agent to the membrane after the yolk/membrane analogues are formed. Where this is the case, the liquid yolk/membrane analogues may be surface dusted with a material—for example HPMC, locust bean gum, carrageenan and/or mixtures thereof—which serve to promote and enhance thickening and "bunching up" of the egg white around the yolk of the egg. This results in adhesion between the membrane and the egg white material.

Alternatively, the surface of the membrane may be at least partially freeze-dried and immersed in treated, natural or synthetic white while freeze-dried to provide a bond between the yolk and the white.

Alternatively, ammonium hydroxide may be used to enhance bonding of the denatured albumen contained in the white to the albumen of the membrane, when an albumen is included therein. The ammonium hydroxide may be removed to complete the bonding process.

When partial freeze-drying of the membrane is used, and similarly, when ammonium hydroxide is used to treat the membrane, simply placing the egg yolk analogue into natural, treated or synthetic egg white may enhance bonding of the white material to the outer surface of the membrane.

The whole egg analogue composition described herein may be prepared by blending the yolk material and forming yolk shapes by hand. The liquid egg yolk analogue material may be chilled, frozen, gelled, or otherwise immobilized into discrete rounded shapes or molded "patties". These immobilized yolks may then be sprayed, painted or otherwise treated with a membrane analogue material on the exposed outer surface of each frozen or immobilized patty to form a coating thereon. The formed and coated yolks may then simply be individually immersed by hand in a setting solution or bath to form the membrane.

The setting bath in this method of preparation is typically a solution wherein the liquid membrane coating reacts to form a liquid-impervious, thin, strong membrane enveloping the liquid yolk material. Where the membrane forming ingredients used in this method are either wholly or partially heat responsive, the setting bath may be heated or the setting bath may comprise a plurality of two baths, some of which may be heated and others which are tepid, hot or cold.

Alternatively, proteolytic enzymes and/or acids, followed by modest heat treatment sufficient to inactivate the enzymes after setting has been completed, can be used in the setting bath to set the membrane analogue. Such heat treatment may include a scalding hot dip to deactivate the enzyme, with a dwell time of about 5 seconds to about 2 minutes.

If the patties are frozen before being exposed to the membrane formulation, the yolk material thaws and/or liquifies if placed into a heated setting bath. It is believed that hydrostatic forces and surface tension serve to cause the yolk material confined within the formed outer membrane to assume a generally spheroidal shape, such as in a natural egg yolk. This type of system-hand application of a liquid membrane coating to a frozen yolk or yolk analogue, followed by a deposit in a suitable setting bath can be automated to permit mass production of whole yolk analogues.

The yolk and its surrounding membrane are then placed into the egg white material (natural, treated or analogue) and the entire composition may be cooked and eaten, used in baking or preserved for later use.

A second alternative method of making whole egg analogues is a mechanized co-extrusion system wherein the yolk formulation is coextruded with the membrane forming material. In this alternative, the yolk material is not intermixed with the membrane forming material. Rather, the yolk material is extruded from a circular tube and the membrane material is extruded essentially concurrently in an annular shape surrounding the yolk material. A predetermined quantity of each formulation is co-extruded and then interrupted to form a yolk and its attendant membrane. Such a dual extrusion is typically made directly into the membrane setting bath, to effect a rapid formation of the membrane surrounding the yolk material.

The forming apparatus for the dual extrusion system may utilize a "dual extrusion" system (not shown) having a first central extrusion nozzle designed to extrude the liquid yolk material, and a concentric annular co-extrusion nozzle surrounding the central extrusion nozzle for simultaneously extruding a liquid membrane formulation in surrounding relation to the extruded yolk analogue in much the fashion of a sausage casing. The co-extruded liquid materials are extruded into a setting bath and pinched, cut, or otherwise subdivided into discrete, somewhat cylindrical, globules having a volume comparable to that of a natural egg yolk. In such an arrangement, the cutting or separation of the co-extruded liquid components serves to close the somewhat cylindrical co-extruded membrane analogue at the cylinder ends. Since the extruded materials comprise a generally liquid system, hydrostatic forces and surface tension cause the discrete globules to assume a generally spheroidal configuration typical of a natural egg yolk.

A preferred alternative method of manufacture encompasses a mechanical process whereby yolk material containing a relatively high level of membrane-forming ingredients is extruded from a single nozzle directly into membrane setting solution. This single extrusion method utilizes the membrane forming agents present in the yolk material to form the membrane on the outer surface of the yolk.

Figure 2:
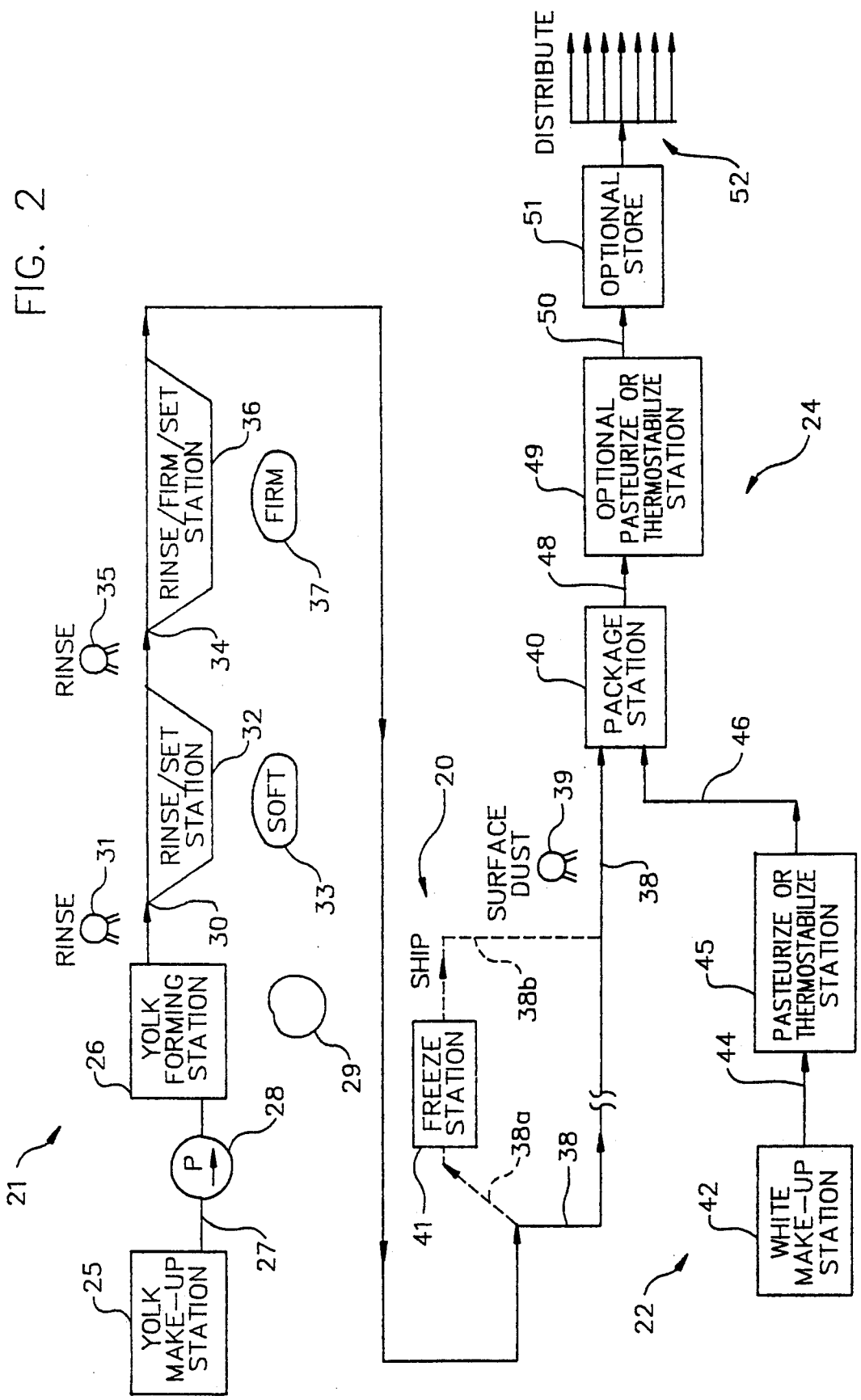
FIG. 2 is block-and-line drawing illustrative of various process steps or stages that can be employed in the production of a whole poultry egg analogue embodying features of the present invention, and also illustrating diagramatically the approximate shapes that the yolk-/membrane analogues assume during formation.

Referring to FIG. 2, a block-and-line diagram has been provided depicting such a single extrusion yolk-/membrane analogue forming system, generally indicated at 20, that can be used to form composite, yolk-/membrane analogues. Such a system is herein referred to as a "single extrusion" system and, is described in connection with FIGS. 2, 3 and 4A through 4C.

Both of the foregoing processes readily lend themselves to use in a system (not shown) such as commonly found in the dairy industry for making "soft ice cream" and the like. That is, in both the single extrusion system and the dual extrusion system, the liquid yolk and liquid membrane forming ingredients can be: i) partially or completely frozen or otherwise immobilized; ii) extruded in a solid or semi-solid frozen and/or immobilized state; iii) cut or otherwise separated into discrete segments having a volume comparable to that of a natural egg yolk; and iv), dropped or otherwise deposited in a setting bath. The exemplary single extrusion system 20 includes two (2) independent, generally parallel component make-up lines—a yolk/membrane make-up line, generally indicated at 21, and an egg white make-up line, generally indicated at 22. These two processes merge into a packaging/output line, generally indicated at 24. The initial processing station in the exemplary yolk make-up line 21 comprises a yolk make-up station 25 in the form of a tank or other receptacle within which various ingredients used to form both the yolk analogue and the membrane analogue are mixed. The ingredients used to form the yolk analogue portion of the composition may include the materials necessary to impart to the finished yolk analogue its appearance, consistency, cooking characteristics, taste and similar organoleptic properties.

The membrane forming ingredients included in the single extrusion formulation which is mixed in tank 25 include membrane forming components capable of forming a thin membrane surrounding the yolk analogue slurry upon reaction between certain of the membrane forming ingredients and a suitable setting agent contained in a setting bath. One or more baths may be set in stages, a first stage at ambient temperature, a second heated stage and, if desired, a third stage at ambient temperature—maintained in a downstream yolk forming station, here designated 26. The membrane forming ingredients included within the liquid formed in tank 25 further preferably include more than one membrane forming ingredient which may be heat responsive and which, when extruded into the setting bath in the yolk forming station 26, forms a relatively thin, strong, liquid-impervious membrane in conjunction with the first membrane forming ingredient.

The liquid yolk material is transferred via line 27 to the downstream yolk forming station 26, for example, by a means of a conventional pump 28. The yolk forming station 26 comprises a tank which may contain a continuously recirculated aqueous setting bath, preferably maintained at an elevated temperature, e.g., equal to or greater than about 159° F. and a mild acid pH, e.g., about 6.2 to 6.5. The bath contains the setting agent or agents required to interact with the membrane forming ingredients in the yolk formulation, e.g., about 0.5% to about 1.0% calcium chloride by weight with or without an acid.

Alternatively, the yolk forming station 26 may comprise a 2-stage or 3-stage system having: 1) a first stage aqueous setting bath containing, for example, calcium ions and/or other setting agents, maintained at tepid conditions—e.g., about 85° F. to about 105° F.; and ii) a second stage heated bath for increasing the viscosity and/or coagulating heat responsive membrane ingredients in the yolk formulation; and iii), if desired, a third stage tepid bath for insuring that the membrane is firmly set prior to subjecting it to downstream cold water rinses, etc.

The first stage of the yolk forming station 26 further includes an exemplary single extrusion forming system which is not shown in FIG. 2; but which is described in connection with FIGS. 3 and 4A through 4C, within such extrusion system is submerged in the setting bath and directly coupled to line 27.

As the yolk material is extruded into the setting bath in discrete globules, a membrane is formed surrounding the globule of liquid yolk material as a result of a reaction between the film forming ingredients contained in the yolk material and the setting agent. The yolk (and membrane) is permitted to reside within the bath in a single bath system for a sufficient length of time—generally from about seven to about twelve minutes—to insure that the forming ingredient(s) contained within the yolk formulation form a membrane surrounding the liquid yolk material. During this residence period within the heated bath, the yolk assumes a generally spheroidal configuration as indicated diagramatically at 29, a configuration comparable to that of a natural yolk.

In a multi-bath system, the yolk/membrane analogues are permitted to reside in a first stage tepid bath from about three to about five minutes to insure formation of the membrane; and to reside in a second stage heated bath for an additional period of about three to about five minutes. And, where a third stage tepid setting bath is provided, the yolk/membrane analogues are allowed to reside therein for a sufficient period of time—e.g., from the order of two to about four minutes—to insure that they are cooled and the membranes are conditioned to tolerate more severe, colder downstream processing.

The yolk analogues may then be conveyed in any suitable manner over line 30 beneath a spray rinse nozzle 31 capable of rinsing and washing the individual yolk analogues with a water spray maintained at any suitable temperature e.g., approximately 45° F. to 52° F., so as to temperature adjust the analogues, speed up setting thereof, remove excess setting ions from the surface thereof, etc. The sprayed yolk analogues may then be delivered to a first rinse/set station which, in the exemplary system, may take the form of a shallow tray 32. The yolk analogues may be maintained in the rinse/set shallow tray 32 for any acceptable period, e.g., approximately ten to twenty minutes in a circulating rinse oath maintained as any acceptable temperature, and at a mild acid to neutral pH. During this period of time, the liquid yolk/membrane analogues may rest on the bottom of the shallow rinse/set tray 32, and, therefore assume a yolk-shaped configuration having a flattened bottom as diagramatically indicated at 33 in FIG. 2—i.e., a shape comparable to that of a natural liquid egg yolk when placed on a flat surface.

The partially set, but still somewhat soft, discrete yolk analogues may be conveyed in any suitable manner via line 34 beneath an optional second spray rinse nozzle 35 where they are sprayed with cold water, e.g., about 32° F. to about 42° F., and delivered to a shallow rinse/firm/set station or a tray 36 where the liquid yolk/membrane analogues reside in a continuously recirculating rinse bath maintained at any acceptable temperature, e.g., about 32° F. to about 42° F. and at any acceptable pH, e.g., about 6.3 to about 6.8. During this period of time, e.g., up to about 30 minutes, the yolk analogues further assume the relatively firm yolk-shaped configuration as indicated diagrammatically at 37 in FIG. 2 with the fully set membranes now being sufficiently strong to permit handling thereof.

At this point, the yolk analogues may be packaged with any suitable egg white material, such as natural egg white, treated egg white or an egg white analogue. In some instances it may be desirable to package at the fabrication facility where the yolk/membrane analogues are formed. Where this is the case, the yolk/membrane analogues may optionally be conveyed by any suitable means over line 38 beneath a spray nozzle 39 where they may be surface dusted with at least one material—for example, HPMC, locust bean gum, carrageenan, and/or mixtures thereof—which promote and enhance thickening and "bunching up" of the egg white around the yolk of the egg and adhesion between the membrane analogue and the egg white material. Thereafter, the surface dusted liquid yolk/membrane analogues are conveyed into a packaging station with the egg white material.

Alternatively, the thickening agent(s) may be formed into a liquid solution with the yolk/membrane analogue being sprayed or dipped therein, or the liquid solution may be added directly to the egg white material itself. When the material is further processed-for example, when pasteurized and/or thermostabilized—the egg white thickens and resumes a natural thick consistency replicating that of the white in a freshly laid natural poultry egg.

In some instances it may be desirable to ship the discrete liquid yolk/membrane analogues to conventional processing facilities for combining with natural egg white. Both the egg white make-up line 22 and the packaging/output line 24 could be located at the processing facilities, rather than the facilities of the liquid yolk analogue fabricator. Under these conditions, the liquid yolk/membrane analogues may be conveyed from the rinse/firm/set station 36 over line 38a to a freeze station 41 where the liquid yolk/membrane analogues are frozen for shipment. As here indicated by line 38b, the frozen liquid yolk/membrane analogues are, upon arrival at the processing plant, passed beneath nozzle 39 and into the packaging station 40 or treated in any of the above-described alternative ways.

In keeping with this exemplary processing arrangement for forming whole egg analogues, the egg white make-up line 22 (which may be locate at either the same facility where the liquid yolk/membrane analogues are fabricated or at an egg cracker's facility) includes an egg white make-up station 42 which may simply be a storage repository for natural egg white, or in which simulated egg white analogue can be synthesized. In either case, a solution of HPMC, locust bean gum and/or carrageenan may be included with the egg white material in the make-up station 42 to enhance thickening of the egg which during later processing. The egg white material is then preferably conveyed via line 44 from the egg white make up station 42 to a pasteurization or thermostabilization station 45; and, from there via line 46 to the packaging station 40 where the egg white material fixedly attaches itself to the outer surface of the membranes.

The whole poultry egg analogues can be individually packaged in any desired form—for example, individually, in six-packs, in twelve-packs, etc.—and, if desired, in a nitrogen or partial nitrogen atmosphere.

Thus the packaged whole egg analogues are then conveyed via line 48 through an optional second stage pasteurization or thermostabilization station 49; and, via line 50 to an option storage station 51 where the egg analogues can be maintained for any desired period of time.

The whole poultry egg analogues are then ready for delivery to distributors, wholesalers and/or retailers as indicated generally at 52.

To facilitate a better understanding of precisely how the yolk/membrane analogues are formed within a single stage yolk forming station such as that depicted diagramatically at 26, FIGS. 3 and 4A through 4C disclose structural components which may be submerged within a setting bath contained within the yolk forming station 26. As the yolk material enters the forming station 26, it is, in this case, extruded directly into the setting bath. This permits a reaction to occur between the membrane forming ingredients contained within the yolk material and the setting compounds contained within the bath.

Figure 3:
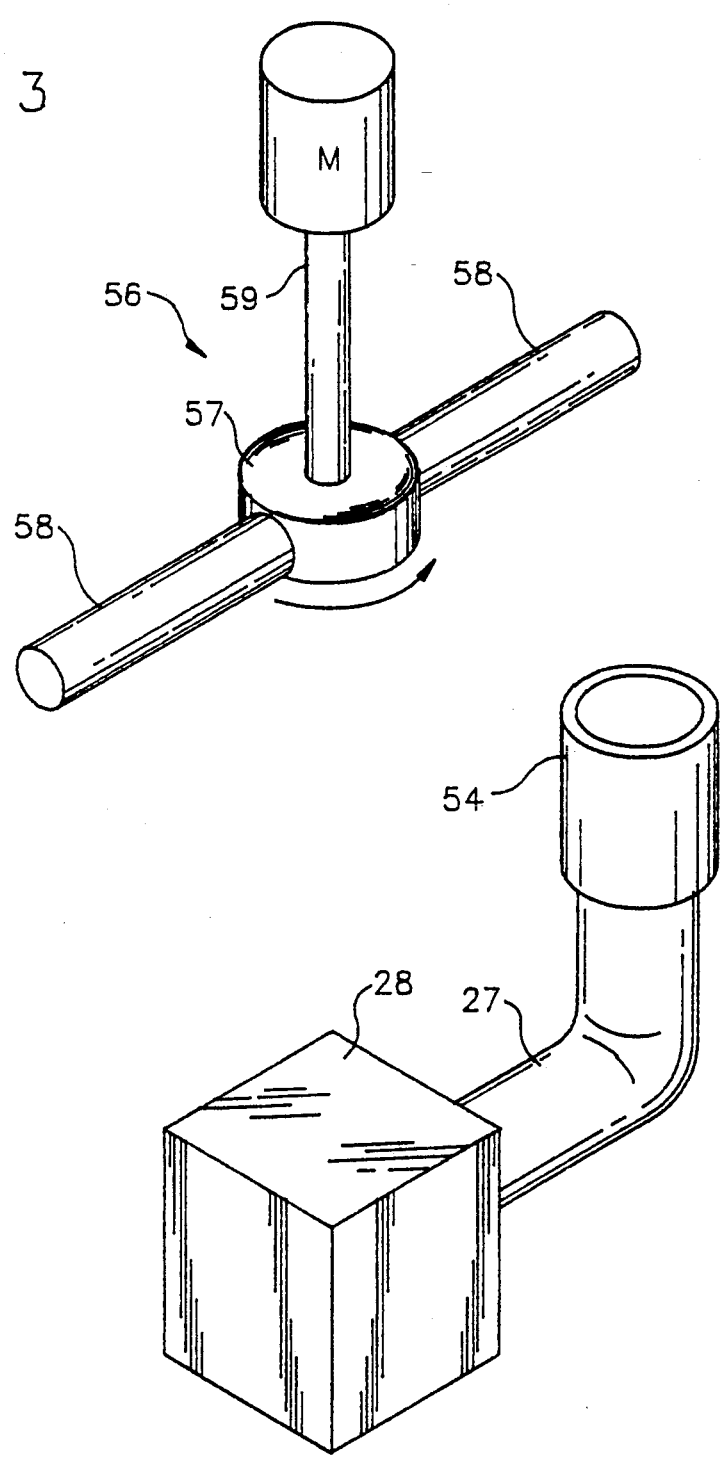
FIG. 3 is one embodiment of a forming apparatus that may be employed in the yolk forming station depicted in FIG. 2 for producing whole yolk/membrane analogues.

Referring first to FIG. 3, the exemplary single extrusion yolk/analogue forming system may include a generally cylindrical, soft, flexible extrusion nozzle 54, which is mounted on the free upper end of the slurry input line 27 coupled to pump 28. The extrusion nozzle is preferably formed of a resilient, soft rubber or rubber-like thermoplastic material. An interrupter assembly, generally indicated at 56, is provided having a central hub 57 and a pair of radiating, round, rigid, interrupter rods 58 extending in opposite directions from the hub 57, which rods may be formed of steel or other suitable rigid metal or plastic material. The arrangement is such that the illustrative interrupter rods 58 lie in a plane normal to a vertical axis extending through the extrusion nozzle 54, with the rods 58 being positioned to engage and flex the upper end of nozzle 54 upon rotation thereof—for example, rotation in a counterclockwise direction as viewed in FIG. 3. In order to obtain the desired interrupting action, hub 57 is coupled via drive shaft 59 to a unidirectional motor "M" which can be submersible and contained within the setting bath in yolk forming station 26 or which can be mounted externally to the bath.

In operation, as the liquid yolk material containing the membrane forming ingredients is extruded into the heated setting bath through nozzle 54, it begins to form a somewhat globular shape 61. The outer surface of the globular shape is in face-to face contact with the setting bath from the instant of extrusion into the bath. As the globule 61 begins to form, one of the driven rotating interrupter arms 58 engages the nozzle 54 (the upper left edge as viewed in FIGS. 4A through 4C) and serves to deform the nozzle. As the nozzle 54 deforms, the discharge opening through which the slurry 60 is passing changes from round, as shown in FIG. 4A, to a somewhat curvilinear slot, as shown in FIG. 4B. This pinches off the globule 61 from the main body of yolk material being extruded through nozzle 54 and inlet line 27.

When the interrupter rod 58 reaches the position shown in FIG. 4C, the discharge end of the nozzle 54 is momentarily closed, severing or pinching off a discrete globule 61 from the main body of material 60, which globule 61 comprises a soft liquid yolk analogue.

The outer surface of the globule 61 has, of course, been in direct contact with the setting agent(s) in the bath from the instant when the yolk material 60 first exited nozzle 54. As a result thereof, the setting agents interact with the membrane forming ingredients contained within the yolk material. At the same time, as the bath changes the temperature of the yolk material, the viscosity of the heat membrane forming ingredients increases. The film forming material coagulates solidifies, crosslinks, etc. and an increasingly strong, thin, liquid-impervious membrane is formed about the surface of the globule 61. Moreover, it has been found that as the long thin curvilinear slot formed by the flexible nozzle in its deformed position is totally closed to crimp to globule 61 from the main body of the yolk material in the inlet line 27 and nozzle 54, a pair of slight protuberances 62 (only one of which is visible in FIG. 4C may form at diametrically opposite ends of the extruded globule 61. The two slight protuberances 62 may closely simulate, in appearance the chalazae 16 (FIG. 1) present in a natural poultry egg.

In general, it has been found that a residence time of from about seven minutes to about twelve minutes in the setting bath and/or in a multi-stage setting bath in yolk forming station 26 is sufficient to insure formation of a relatively strong, stable, membrane surrounding the globule 61.

After the interrupter rod clears the soft flexible extrusion nozzle 54—i.e., as the rod 58 continues to move to the right from the position shown in FIG. 4C—the nozzle 54 springs back to the cylindrical configuration shown in FIG. 4A. The yolk/membrane material 60 continues to be extruded therefrom so as to form multiple yolk/membrane analogues in sequential order.

The size or volume of the yolk/membrane analogues formed with the system such as depicted in FIGS. 3 and 4A through 4C may vary with the diameter of the nozzle 54, the speed with which the yolk material 60 is extruded from the nozzle 54, the rotational speed of the interrupter arms 58 and the number of interrupter arms 58 mounted on hub 57. Generally, however, such variable parameters will be preset so as to produce yolk membrane analogues weighing approximately sixteen grams. Where desired, the apparatus described above may employ multiple input lines 27 terminating in multiple parallel soft flexible ejection nozzles 54 which are sequentially flexed by rotation of the interrupter assembly.

When a single extrusion or double extrusion is used, the yolk forming material may be partially or thoroughly frozen in an extrudable condition, such as in the case of soft ice cream. The membrane setting solution into which the yolk and membrane material are extruded should be at an elevated temperature, e.g. about 160° F. This elevated temperature, taken in conjunction with the bath components, is useful for setting the membrane which contains the yolk. After a predetermined period, e.g. about 3 to about 12 minutes, the yolks with their attendant membranes may be removed from the setting bath and placed into an optional wash, useful for removing excess membrane forming ions from the surface of the membrane. The yolks may then simply be removed from the bath and placed into natural egg white or an egg white analogue as described above. The washes may comprise water or any other non-reactive fluid, and typically are at a temperature ranging from about room temperature to as low as about 32° F. Preferred single extrusion formulations include the following:

|  | % weight |
|---|---|
| A. Yolk/Membrane Ingredients | |
| flavorants | 0 to 15.0 |

-continued

|  | % weight |
|---|---|
| thickeners | 0.1 to 3.0 |
| fats/oils | 0.1 to 15.0 |
| water | 50.0 to 98.0 |
| emulsifiers | 0.01 to 1.0 |
| film-formers | 1.0 to 5.0 |
| cross-linkers | 0 to 1.0 |
| protein | 0 to 2.0 |
| Total | 100.0% |

B. Yolk Membrane Ingredients

|  |  |
|---|---|
| flavorants | 1.0 to 5.0 |
| thickeners | 1.0 to 12.0 |
| fats/oils | 15.0 to 50.0 |
| water | 25.0 to 70.0 |
| emulsifiers | 0.5 to 5.0 |
| deaerators | 0.1 to 2.0 |
| heat releasable ions | 0.5 to 2.0 |
| chelaters/complexers | 0.001 to 0.5 |
| proteins | 1.0 to 10.0 |
| Total: | 100% |

The yolks with or without the attendant egg white material may then be sterilized or pasteurized by appropriate methods, e.g., heat pasteurization, sulfur dioxide, ultraviolet light sterilization and the like. Alternatively, the ingredients and/or the components may be pasteurized or sterilized prior to analogue formation and the composition formed under sterile or clean conditions.

The composition described herein may use components selected to provide variable viscoelastic properties for the yolk and its attendant membrane over a wide range, such as a finished whole or scrambled egg analogue which will stay soft and moist even if overcooked. Alternatively, the composition may be formulated to harden and become rubbery in cross-section with relatively little cooking. Hence, great variation in the end product is possible by following the teachings herein.

EXAMPLE I

Part A: Yolk Formulation

| Chicken Broth (Swanson low salt) | 500.0 ml. |
|---|---|
| Egg White (liquid) | 200.0 g. |
| Soy Lecithin (Fearn Co.) | 6.0 g. |
| Xanthan Gum (Colony Import) | 2.0 g. |
| Gelatin - 300 bloom (Hormel) | 6.0 g. |
| Margarine (unsalted) | 115.0 g. |

Procedure

Simmer the chicken broth to concentrate from 500 ml. to about 300 ml. Add the gelatin and blend in a Waring high-speed blender for 3 to 5 minutes. Allow to cool, and add 2 drops SAG 710 Silicone Antifoam Emulsion and the xanthan gum. Blend 1 to 2 minutes.

In a separate container, blend the egg white and lecithin for 3 to 5 minutes.

Combine the egg white mixture and the broth mixture, and blend for 2 to 3 minutes.

Melt the margarine in a microwave oven, and add the melted margarine to the mixture.

Add color (Crompton & Knowles Chroma Kote No. 5) until the blend matches nos. 7 to 8 on a Roche Yolk Colour Fan.

Pour about 12.0 g. into an appropriate mold and freeze (about 2 hours).

Alternative Part A: Yolk Formulation

Combine the ingredients described and include lactic acid (1.0 g) in the formulation. The lactic acid acts as a buffer and flavorant. Then treat the composition as described above, freezing into an appropriate number of frozen "patties".

Part B: Membrane Formulation

| Egg White | 150.0 ml. |
|---|---|
| Soy Lecithin (Fearn Co.) | 1.0 g. |
| Sodium Alginate (Kelgin L.V.) | 2.25 g. |
| Locust Bean Gum (High Tech Polymers) | 1.0 g. |
| Water | 12.0 ml. |

Procedure

Combine the egg white, water and lecithin, and blend for 3 to 5 minutes in a Waring high-speed blender.
Add the sodium alginate and blend for 10 minutes.
Add the locust bean gum and blend 2 to 3 minutes.
Add 1 to 2 drops of SAG 710 silicone oil and blend 2 to 30 seconds.
This composition may be set aside (2 to 3 hours) or treated with a vacuum deaerator to remove any air.

Alternative Part B: Membrane Formulation

| Egg white | 220.0 ml. |
|---|---|
| Soy lecithin (Fearn Co.) | 2.0 ml. |
| sodium alginate (Kelgin LV) | 1.5 g. |
| water | 12.0 ml. |

Combine the soy lecithin and egg white and homogenize in a blender for about five minutes. Add 1 drop of food grade silicone if necessary. Add sodium alginate LV and blend for about 2 minutes. Allow to sit for about 10 minutes to deaerate, and reblend for about 30 seconds if necessary.

Add beta carotene to match no. 7 on a Roche Yolk Colour Fan. Add the water and set the mixture aside.

Part C: Setting Bath

| Calcium Chloride (Dow Chem. Co.) | 8.0 g. |
|---|---|
| Lactic Acid (All World Scientific Co.) | 8.0 g. |
| Water q.s. ad. | 1200 mls. |

Procedure

Blend calcium chloride and lactic acid in hot water.
Place frozen yolk from part A into the coating composition of part B, coating the surface completely. Remove the coated frozen yolk and immerse into the calcium bath described above for from 4 to 10 minutes, until the membrane sets. When using the alternative setting bath, residence time may be 5 to 8 minutes.

Remove from the calcium bath and immerse into a first bath (room temperature).

Remove from the first bath and place in an ice water bath for 20 minutes allowing the membrane to set completely and removing any excess calcium.

Alternative Part C: Setting Bath and Procedure

Substitute hydrochloric acid (4.0 g) or acetic acid (4.0 g) for the lactic acid. Monitor the pH range of the bath during treatments and maintain at 6.2 to 6.6.

After allowing the coated frozen yolk analogues to set (5 to 8 minutes) transfer to a scalding bath (about 210° F.), at a pH range of about 6.5 to 6.9 for 1 to 1.5 minutes.

Remove the yolks from the bath and place in a rinsing tray with water at a temperature ranging from 46° F. to 54° F., and pH adjusted to 6.4 to 6.9. Set the rinse depth at about two thirds to three fourths the diameter of the formed yolks. Allow to rinse for about 5 minutes.

Transfer to a second shallow rinsing pan containing water pH adjusted to 6.4 to 6.9 at a temperature of about 34° F. to about 42° F. Allow to equilibrate for about 10 to 30 minutes.

Remove and surface dry.

Dust the yolk/membranes with a powder comprising 50:50 locust bean gum: HPMC (or spray with a 1% solution of locust bean gum and HPMC). Air dry, then place the yolk into natural egg white, treated egg white or other white analogue.

Note that another alternative is to include locust bean gum and HPMC in the egg white material. If lactic acid is present in the yolk, as described above in alternative part A, the setting bath may not require acid.

EXAMPLE 2

| Part A: Yolk Formulation | |
| --- | --- |
| Chicken Broth (Swanson) | 1000.0 ml. |
| Sodium Alginate (Kelcoloid S, Kelco Div. Merck & Co.) | 7.0 g. |
| Sodium Alginate (Kelcogel LV, Kelco) | 7.0 g. |
| Sodium Alginate (Kelgin HV, Kelco) | 2.0 g. |
| Safflower Oil Margarine (Wilsey Foods, Inc.) | 115.0 g. |
| Silicone Antifoam (SAG 710) | 2.0 ml. |
| Beta-Carotene (Hoffmann la Roche) | q.s. |

Procedure

Mix the yolk analogue ingredients in a food processor in order: 1000 ml. concentrated chicken broth, Kelcoloid S, Kelcogel LV, and silicone, and blend at high speed for 5 to 10 minutes.

Add melted safflower oil margarine and blend, adding dye to a visual standard while mixing, about 2 minutes.

Remove and place in a vacuum container and evacuate with a vacuum pump to approximately 30 inches of mercury for 20 minutes or until entrained air is removed.

Immobilize yolk by freezing into 11 to 14 g. wafers, approximately 0.75 inch thick by 2 inches in diameter.

| Part B: Membrane Formulation | |
| --- | --- |
| Water | 225.0 ml. |
| Denatured Whey Proteins (25%) | 75.0 g. |
| Pre-Gelatinized Rice Flour (High Amylopectin) (Riviana Foods, Inc.) | 15.0 g. |
| Chicken Meat (Holly Farms) | 35.0 g. |
| Ammonium Hydroxide (J. T. Baker Chem. Co.) | 1.0 ml. |
| Sodium Phosphate Dibasic | 1.0 g. |
| Sodium Alginate (Kelgin LV) | 5.0 g. |
| Polyglycol Antifoam | 2.0 g. |
| Beta-Carotene | q.s. |

Procedure

Blend the water and pre-gelatinized rice flour and homogenize for 2 minutes.

Blend separately the chicken meat, ammonium hydroxide, sodium phosphate dibasic, polyglycol (antifoam) and dye for 3 to 5 minutes, and add to the water - flour mixture.

Maintain liquid at about 120° F.

Add denatured whey protein in water (75% w/v) and sodium alginate and blend on low speed to obtain distribution, about 10 to 15 seconds.

Deaerate the batter as described above.

| Part C: Setting Bath | |
| --- | --- |
| Water | 300.0 ml. |
| Hydrochloric Acid | 4.5 ml. |
| Calcium Chloride | 6.0 g. |
| Lactic Acid | 10.5 g. |

Procedure

Coat the immobilized yolks with the membrane formulation, and place into the setting solution, at 140° F.

Soak the yolk for 2 to 5 minutes to set the membrane.

Remove the yolk from the setting solution, and place into a room temperature water bath for 5 minutes.

Remove from the room temperature bath, and place into an ice water bath for ten minutes.

Remove the yolk and air dry (about 1 minute).

A whole egg analogue synthesized using this yolk analogue will have medium viscosity and will be more resistant to hardening, suitable for general purpose preparation. The lactic acid contained in the reactant fluid assists in forming the containment membrane and enhancing the poultry flavor.

EXAMPLE 3

| Yolk Formulation | |
| --- | --- |
| Chicken Broth (Swanson) | 1000.0 ml. |
| Safflower Oil Margarine (Saffola) | 115.0 g. |
| Gluten Sulfate | 6.0 g. |
| Gelatin (Knox, 300 bloom) | 6.0 g. |
| Acacia Gum (Colony Import & Export) | 2.0 g. |
| Silicone Antifoam (S.A.G. 710) | 1.0 g. |

Procedure

Blend the chicken broth, silicone, acacia, gluten sulfate and gelatin at high speed for 3 to 5 minutes.

Add melted margarine, and blend for 5 to 10 minutes.

Freeze the yolk composition in yolk shapes, and treat with a membrane forming composition and a setting bath as described above.

The yolk analogue may then be incorporated into a whole egg analogue by adding to natural synthetic or treated egg white. It will yield a thin, flowing yolk upon rupture of the containment membrane.

EXAMPLE 4

| Yolk Formulation | |
| --- | --- |
| Chicken Broth (Swanson Clear Broth) | 1000.0 ml. |
| Chicken Meat (Holly Farms) | 70.0 g. |
| Pre-Gelatinized Rice Flour (Riviana Foods) | 70.0 g. |

-continued

| Yolk Formulation | |
|---|---|
| Kelgin LV | 7.0 g. |
| Kelgin HV | 7.0 g. |
| Calcium Carbonate Precipitate | 5.0 g. |
| Egg White | 300.0 ml. |

Procedure

Homogenize the chicken meat and the chicken broth.

Combine the Kelgin LV, Kelgin HV, calcium carbonate and flour and blend. Add the Kelgin et al. to the chicken mixture, and add egg white. Deaerate this mixture to form the yolk composition. Immobilize the yolk composition as previously described, coat with a membrane solution and place in a setting bath.

This yolk may be cooked to form a soft boiled or hard boiled yolk which may be eaten whole or incorporated into egg salad, or used to form "tube eggs" for institutional use in sandwich making.

EXAMPLE 5

| Yolk Formulation | |
|---|---|
| Chicken Broth (Swanson) | 500.0 ml. |
| Kelcoloid S | 9.0 g. |
| Kelcogel LV | 7.0 g. |
| Kelgin HV | 2.0 g. |
| Safflower Oil Margarine (Wilsey Foods, Inc.) | 115.0 g. |
| Collagen (Geo. A. Hormel & Co.) | 90.0 g. |
| Magnesium Sulfate | 1.0 g. |
| Calcium Carbonate | 1.0 g. |
| Beta-Carotene | q.s. |

Procedure

Combine the chicken broth, Kelcoloid S, Kelcogel LV, Kelgin HV and magnesium sulfate and blend for 5 minutes.

Add the collagen, and calcium and continue blending; then add melted margarine, and beta-carotene until colored to suit.

Deaerate and immobilize in appropriate quantities, about 10 to 15 g.

Apply a membrane forming solution to the immobilized yolk material, and set the membranes in a setting solution as described above.

The yolk prepared may have more firmness than the yolk of example 4 apparently based on the higher concentration of divalent ions.

EXAMPLE 6

| Yolk Formulation | |
|---|---|
| Chicken Broth | 500.0 ml. |
| Gelatin | 90.0 g. |
| Methylcellulose (A4M Dow Chem. Co.) | 9.0 g. |
| Dextrin | 8.0 g. |
| Waxy Cornstarch | 25.0 g. |
| Corn Oil Margarine | 100.0 g. |
| Low Methoxyl Pectin | 5.0 g. |
| Egg White | 400.0 g. |
| Beta-Carotene | q.s. |

Procedure

Boil the chicken broth and add the gelatin and Methocel. Allow to cool, and add dextrin, starch, pectin and egg white.

Melt the margarine, and add to the mixture. Blend 3 to 5 minutes and add beta carotene to color.

Immobilize the yolks, coat and treat as described above.

This yolk is capable of being supported by a delicate containment membrane, being semi-solid while refrigerated. This characteristic results in less pressure being exerted against the containment membrane while the egg analogue is stored. It also results in a very normal egg yolk appearance when assembled into a whole egg analogue.

EXAMPLE 7

| Yolk Formulation | |
|---|---|
| Chicken Broth (Swanson) | 1000.0 ml. |
| Safflower Oil Margarine (Wilsey Foods) | 115.0 g. |
| Chicken Breast (homogenized) | 70.0 g. |
| Pre-Gelatinized Rice Flour (Riviana Foods, Inc.) | 70.0 g. |
| Kelgin LV | 7.0 g. |
| Kelgin HV | 2.0 g. |
| Adipic Acid (Monsanto) | 3.0 g. |
| Calcium Carbonate (ppt) | 5.0 g. |
| Sodium Hexametaphosphate (Monsanto) | 1.0 g. |
| Beta-Carotene (Hoffmann la Roche) | q.s. |

Procedure

Combine the ingredients as follows:

Incorporate into the chicken broth the homogenized chicken breast, Kelgin LV, Kelgin HV, adipic acid, and sodium hexametaphosphate, and then blend for 5 minutes. Add the calcium carbonate, rice flour and melted margarine with continued blending.

The yolk formulation is immobilized and used with any selected membrane formulation, to form a slow-hardening yolk analogue.

EXAMPLE 8

| Part 1: Membrane Formulation | |
|---|---|
| Water | 220.0 ml. |
| Carboxymethylhydroxypropyl Guar Gum | 3.0 g. |
| Silicone Oil | 1.0 g. |

Procedure

Combine the listed ingredients, mix in a food processor, and set aside.

| Part 2: | |
|---|---|
| Denatured Egg Albumin | 40.0 g. |
| Water | 80.0 ml. |
| Ammonium Hydroxide | 1.0 ml. |

Procedure

Combine the ingredients of part 2 in a high speed blender and blend for 1 to 2 minutes. Add parts 1 and 2 together in a food processor and blend for an additional 5 to 10 minutes. Add beta carotene to dye the composition as desired.

This composition may be used to coat immobilized yolks, after which the coated yolks are placed into a setting bath.

EXAMPLE 9

| Membrane Formulation | |
| --- | --- |
| Gelatin (Hormel) | 300.0 g. |
| Powdered Acacia (Colony Import & Export) | 100.0 g. |
| Water | qs. ad 1000.0 ml. |

Procedure

Disperse the gelatin and acacia in hot water, and allow to cool. This formulation forms a gel membrane which may be coated onto immobilized yolks. The coated yolks are then placed into a high pH setting bath, around 9–10, as previously described. Dry the formed membranes and repeat as needed.

EXAMPLE 10

| Membrane Formulation | |
| --- | --- |
| Soy Milk (Erie Casein Co.) | 250.0 g. |
| Carboxymethylcellulose (Dow Chem. Co.) | 100.0 g. |
| Denatured Albumen (Crystal Foods, Inc.) | 100.0 g. |
| Water | qs. ad. 1000.0 ml. |

Procedure

Combine the ingredients and coat onto immobilized yolks.

Then place the coated yolks in a setting bath, as previously described, except that glyceraldehyde may be included in the setting bath in addition to a calcium salt.

EXAMPLE 11

| Membrane Formulation | |
| --- | --- |
| Egg White | 600.0 g. |
| Water | 390.0 ml. |
| Ammonium Hydroxide (J. T. Baker) | 5.0 ml. |
| Sorbitol | 5.0 g. |

Procedure

Blend the egg white and ammonium hydroxide. Then add sorbitol and gradually add the water with continued blending to form a coating composition which is homogeneous. Refrigerate or freeze to thicken the coating and resultant membrane. The membrane sets as ammonium hydroxide evaporates off from the coated yolks.

Alternatively, the ammonium hydroxide in the coated yolks may be neutralized with a mild acid vapor or acid bath.

EXAMPLE 12

| Part A: Membrane Formulation | |
| --- | --- |
| Guar gum (TIC Gums, Inc.) | 3.0 g. |
| Kelcogel LV | 3.0 g. |
| Water | 300.0 ml. |
| Silicone antifoam (S.A.G. 710) | 1.0 g. |
| Beta carotene | q.s. |

Procedure

Blend the guar gum and Kelcogel LV with silicone and water in a food processor for 5 minutes. Add beta carotene as desired. Deaerate in a vacuum and coat onto immobilized yolk.

Part B: Setting Bath

A preferred setting bath for the coating formulation of Example 12 is set forth below.

| | |
| --- | --- |
| Aluminum Potassium Sulfate | 2.0 g. |
| Ferrous chloride | 3.0 g. |
| Calcium chloride | 20.0 g. |
| Hydrochloric acid | 20.0 ml. |
| Lactic acid (All World Scientific Co.) | 80.0 ml. |
| Water | q.s. ad. 1000.0 ml. |

Place the coated yolks into the setting bath at 120° to 140° F. for 5 minutes. Then rinse as previously described.

EXAMPLE 13

| Part A: Yolk Formulation | |
| --- | --- |
| Chicken Broth (Swanson) | 250.0 ml. |
| Methylcellulose (A4M, Dow Chemical Co.) | 8.0 g. |
| Kelgin HV | 6.0 g. |
| Corn oil margarine (Fleischman's) | 130.0 g. |
| Egg white | 600.0 ml. |
| Beta carotene (Hoffmann la Roche) | q.s. |
| FD&C Yellow No. 5 (Chroma Kote) | q.s. |

Procedure

Combine the broth, Methylcellulose, Kelgin HV and margarine (molten) while beating.

Cool and add egg whites, then mix as needed.

Add dyes as required, and deaerate in a vacuum chamber at 7 to 15 inches of mercury for 20 minutes.

Freeze in the presence of an air current (28° F.) for 20 minutes.

| Part B: Membrane Formulation | |
| --- | --- |
| Water | 150.0 ml. |
| Kelcogel LV | 4.0 g. |
| Glycerol | 10.0 g. |
| Egg white | 150.0 g. |
| Pre-gelatinized rice flour (Riviana) | 30.0 g. |
| Silicone (S.A.G. 710) | 2.0 g. |
| Beta carotene (Hoffmann la Roche) | q.s. |
| Yellow food dye (Chrona Kote No. 5) | q.s. |

Procedure

Combine water (100 ml.) and pre-gelatinized rice flour in a homogenizer and homogenize for 15 minutes, maintaining the temperature below about 130° F. Add Kelcogel LV and blend an additional 5 minutes. Add glycerol, silicone egg white and water (50 ml.) and dye to a selected color standard.

Remove yolk analogues from molds as described above, and dip each yolk in containment membrane coating batter.

| Part C: Setting Bath | |
|---|---|
| Water | 200.0 ml. |
| Hydrochloric acid | 3.2 g. |
| Calcium chloride | 4.0 g. |
| Lactic acid | 8.0 g. |

Procedure

Place each containment membrane coated yolk into setting bath for 5 minutes. Remove and rinse in tepid water 20 minutes. Surface dry. Add to white.

This yolk formulation provides a non-reactive yolk, which does not solidify, even upon prolonged cooking. If the acid used herein imparts a sour taste to the yolks, it may be necessary to reduce the acid components in the bath by as much as 80 percent to eliminate the sour taste.

EXAMPLE 14

| Part A: Yolk Formulation | |
|---|---|
| Chicken broth | 500.0 ml. |
| Kelcogel LV | 8.0 g. |
| Kelcoloid S | 10.0 g. |
| Kelgin HV | 2.0 g. |
| Corn oil margarine (Fleischman's) | 140.0 g. |
| Beta carotene | q.s. |
| FDC Yellow No. 5 (Chroma Kote, T 815y, Crompton & Knowles Corp.) | q.s. |

Procedure

Combine the listed ingredients at hot temperature below boiling. Deaerate by vacuum and form yolks to provide a yolk analogue which is moderately reactive.

| Part B: Membrane Formulation | |
|---|---|
| Water | 400.0 ml. |
| Uncooked chicken meat | 59.0 g. |
| Kelcogel LV | 6.0 g. |
| Silicone (S.A.G. 710) | 2.0 g. |
| Ammonium hydroxide | 2.0 g. |
| Sodium phosphate dibasic | 2.0 g. |
| Beta carotene | q.s. |
| Oil soluble yellow food dye (Chroma Kote) | q.s. |

Procedure

Combine ingredients as described above, and deaerate by vacuum.

Then place the yolks in the membrane formulation and set membrance with a setting bath as described above.

EXAMPLE 15

| Yolk Formulation | |
|---|---|
| Chicken broth | 400.0 ml. |
| Kelgin HV | 5.0 g. |
| Kelcogel LV | 12.0 g. |
| Corn oil margarine (Fleischman's) | 115.0 g. |
| Egg white | 350.0 ml. |
| Water | 100.0 ml. |
| Beta carotene | q.s. |
| FDC Yellow No. 5 (Chroma Kote) | q.s. |

Procedure

Combine the listed ingredients at a temperature below boiling. Deaerate by vacuum and form yolk shapes as previously described.

Coat the yolk analogues with the membrane formulation of Example 14, and place in the setting bath described therein.

Soak the coated yolks in the setting solution for about ten minutes and rinse in cool water.

EXAMPLE 16

| Part A: Yolk Formulation | |
|---|---|
| Chicken broth (Swanson) | 500.0 ml. |
| Kelcogel LV | 16.0 g. |
| Kelgin HV | 2.0 g. |
| Corn oil margarine (Fleischman's) | 115.0 g. |
| Beta carotene | 0.04 g. |
| FDC Yellow No. 5 (Chroma Kote) | 1.5 ml. |
| Part B: Membrane Formulation | |
| Water | 275.0 ml. |
| Pre-gelatinized rice flour (Riviana Foods, Inc.) | 15.0 g. |
| Uncooked chicken breast | 4.0 g. |
| Sodium phosphate dibasic | 1.0 g. |
| Ammonium hydroxide | 1.0 ml. |
| Kelcogel LV | 5.0 g. |
| Glycerol | 5.0 g. |
| Silicone (S.A.G. 710) | 2.0 g. |
| Egg whites | 75.0 ml. |
| Part C: Setting Bath | |
| Water | 300.0 ml. |
| Hydrochloric acid | 4.5 ml. |
| Calcium chloride | 6.0 g. |
| Lactic acid | 10.5 g. |

Procedure

Prepare the yolk formulations as previously described and immobilize the yolks by freezing. Dip the yolks into the membrane forming composition, and then soak in the setting bath at about 140° C. for 5 to 10 minutes.

Wash in cool water for 20 minutes to remove any excess ions. This yolk analogue which can be added to natural synthetic or treated egg white to make a whole egg analogue.

EXAMPLE 17

| Part A: Yolk Formulation | |
|---|---|
| Chicken broth (Swanson) | 500.0 ml. |
| Kelcoloid S | 7.0 g. |
| Kelcogel LV | 7.0 g. |
| Kelgin HV | 2.0 g. |
| Corn oil margarine (Fleischman's) | 115.0 g. |
| Silicone (S.A.G. 710) | 2.0 g. |

Procedure

Combine ingredients adding silicone and simmered chicken broth and blend 5 minutes. Add the Kelcoloid S, Kelcogel LV and Kelgin HV and blend for 5 minutes. Add melted margarine and blend for 10 minutes. Color, if desired, with beta carotene. Vacuum deaerate for 20 minutes.

This formulation provides a thin yolk with moderate reactivity.

| Part B: Membrane Formulation | |
| --- | --- |
| Water | 225.0 ml. |
| Pre-gelatinized rice flour | 15.0 g. |
| Uncooked chicken breast | 35.0 g. |
| Glycerol | 5.0 g. |
| Sodium phosphate dibasic | 1.0 g. |
| Ammonium hydroxide | 1.0 ml. |
| Kelcogel LV | 5.0 g. |
| Silicone | 2.0 g. |
| Egg whites | 75.0 ml. |

Procedure

Homogenize the chicken breast and treat with ammonium hydroxide. Add the silicone to the water, and add glycerol, sodium dibasic phosphate, chicken breast, and rice flour. Blend for 10 minutes. Add the Kelcogel LV and continue blending, then add egg white and mix for 5 to 10 seconds only. Color as desired. Vacuum deaerate and chill.

After mixing the yolk formulation, it may be pasteurized prior to the molding and immobilizing steps. The yolks are then molded and frozen.

The immobilized yolks are dipped in a membrane formulation, and then treated with a setting solution at about 140° F. for about 5 minutes, until the membrane sets.

After the membrane sets, the yolks are placed into one or more washing baths then surface dried.

The yolks are then added to conventional egg white, treated egg white or an egg white analogue.

EXAMPLE 18

| Part A: Yolk Formulation | |
| --- | --- |
| Chicken broth (defatted) | 500.0 ml. |
| Gelatin (Knox Unflavored) | 7.0 g. |
| Methylcellulose (A4M Dow Chemical) | 5.0 g. |
| Kelgin HV | 7.0 g. |
| Corn oil margarine (Fleischman's) | 115.0 g. |
| Silicone (SWS Silicones Corp. No. 211) | 1.0 g. |

Procedure

Bring 350 ml concentrated de-fatted chicken broth and gelatin to a boil. Add Silicone and blend in a mixer with methylcellulose for 5 to 10 minutes.

Add 7 gms. Kelgin HV to the mixture and blend 10 to 15 minutes until the mixture cools and alginate is completely dissolved. Add margarine while mixture is still warm to effectuate melting of margarine and assist in cooling down.

In a container, freeze the remaining 150 ml. chicken broth. Then add frozen broth or otherwise cool to bring temperature down to less than 20° C and blend for 20 minutes or until methylcellulose is completely dissolved.

The foregoing batter may be freed of entrained air by heating the batter in a microwave slightly and allowing all air to escape before forming into yolks.

Form into yolk shape through an extrusion machine or by pouring into molds of appropriate yolk shapes.

This yolk formulation forms hard yolk analogues, which simulate the texture of the yolks of hard boiled eggs. It is therefore useful as a hard boiled whole egg analogue, egg salad or deviled egg analogues when combined with white.

EXAMPLE 19

| Membrane Formulation | |
| --- | --- |
| Sodium hexametaphosphate (Monsanto Co.) | 2.6 g. |
| Water | 750.0 ml. |
| Soy protein (Chemurgy Co.) | 20.0 g. |
| Pregelatinized rice starch (Riviana Foods) | 29.0 g. |
| Kelgin LV | 22.0 g. |
| Maltodextrin (A. E. Stanley Mfg. Co.) | 37.0 g. |
| Glycerol | 10.0 g. |

Procedure

Mix sodium hexametaphosphate in water and dissolve protein. Add remaining ingredients and chill.

EXAMPLE 20

| Membrane Formulation | |
| --- | --- |
| Water | 300.0 ml. |
| Acacia gum (Colony Import & Export) | 1.5 g. |
| Kelgin LV | 3.0 g. |

Procedure

Blend all ingredients at ambient room temperature for 5 to 10 minutes or until hydrocolloids are completely dissolved. Color to standard using beta carotene, dry canthaxanthan red and Neobee oil lecithin FD&C yellow no. 5.

The membrane coating formulation should be freed of entrained air before use.

EXAMPLE 21

| Setting Bath | |
| --- | --- |
| Water | 500.0 ml. |
| Lactic acid (88% solution) (Mallinkrodt) | 4.0 g |
| Calcium chloride | 7.0 g. |
| Hydrochloric acid | 1.0 g. |

Procedure

Mix all ingredients in water at about 90° C., and maintain fluid at this temperature throughout use period.

Coat any formed yolk analogue with a layer (approximately 1/32 inch thick) of any membrane formulation. Contact the surface of the coated yolk immediately with reactant fluid. Keep in contact for 5 to 7 minutes.

Rinse or soak copiously in fresh, cool water at about 15° C. until yolk firms up, approximately 5 to 10 minutes.

An egg analogue made utilizing the higher calcium content in the setting bath will form a hardened yolk when cooked. The hardened yolk is very similar in all respects to natural hard cooked egg yolk. This egg analogue makes excellent hard-yolk cooked fried eggs, sandwiches, such as fried eggs or tube egg. It also makes hard boiled eggs, such as for eating or making egg salad, potato salad, or deviled eggs.

EXAMPLE 22

| Part A: Yolk Formation | |
|---|---|
| Chicken broth (Swanson) | 300.0 ml. |
| Egg whites | 200.0 g. |
| Lecithin (Fearn Co.) | 6.0 g. |
| Xanthan gum (Kelco) | 2.0 g. |
| Gelatin (Hormel) | 6.0 g. |
| Unsalted margarine (Wilsey) | 115.0 g. |

Procedure

Blend egg whites with lecithin for about 5 minutes in high speed blender. Boil 500 mls. chicken broth down to 300 ml. Add gelatin and blend for 2 or 3 minutes. Add xanthan gum and blend until cool. Add egg whites and blend. Add margarine and color if desired. Freeze in 1-oz. cups (about 12 gms. each).

| Part B: Membrane Formulation | |
|---|---|
| Egg whites | 150.0 ml. |
| Kelgin LV | 2.25 g. |
| Locust bean gum (Hi Tek Polymers, Inc.) | 2.00 g. |
| Water | 12.00 ml. |

Procedure

Combine ingredients, treating the egg white with lecithin to "kill" the egg white. Add 1-2 g silicone oil to reduce foaming. Coat onto yolks as previously described.

EXAMPLE 23

| Single Extrusion Formulation | |
|---|---|
| Chicken broth (Swanson) | 250.0 ml. |
| Kelgin LV | 4.25 g. |
| Carrageenan (Sea Gel FL 674P) | 1.75 g. |
| Locust bean gum (Hi Tek Polymers, Inc.) | 1.0 g. |
| Sodium citrate (J. T. Baker) | 0.25 g. |
| Unsalted margarine (Wilsey Foods) | 57.5 g. |

Procedure

Blend the chicken broth and Kelgin LV in a high speed blender for 10 minutes.

Add the carageenan and continue blending 2 to 4 minutes.

Add locust bean gum and sodium citrate, and blend for 2 to 3 minutes.

Melt the margarine and add to the mix with continuing blending.

If significant air entrapment occurs, slight heat or deaerate under vacuum will remove any entrained air.

Chill this formula thoroughly and extrude 12 to 14 g. portions into a calcium setting bath as previously described. Soak in the setting bath for 4 to 10 minutes, at 125° to 140° F.

Remove and place in a chilled water bath for 20 to 30 minutes.

Remove and air dry for 1 to 3 minutes, and combine the formed yolk analogues with egg white, treated egg white or an egg white analogue.

EXAMPLE 24

| Single Extrusion Formulation | % by weight |
|---|---|
| Deionized water | 83.75 |
| Manugel C (Kelco) | 1.35 |
| Methocel F-50 (Dow Chem. Co.) | 0.30 |
| Clintose LV (ADM Corp.) | 1.20 |
| Partially Hydrogenated Corn Oil 400-0300 (Staley) | 12.63 |
| Lecithin (Central Soya) | 0.50 |
| Locust Bean Gum (Hi Tek Polymers) | 0.20 |
| Beta carotene (Hoffmann laRoche) | 0.07 |
| | 100.00 |

Procedure

Premix the dry ingredients and slowly sift into water while mixing. Agitate without vortex to void aeration. Mix for 10 minutes.

Premix the corn oil, lecithin and beta carotene, heating the corn oil until molten as necessary.

Slowly pour the oil premix into the aqueous portion while maintaining the agitation, over 10 minutes.

Prepare a water bath containing 0.66% calcium chloride and 0.66% lactic acid, and heat to 140° F. Also prepare an ice water bath, using deionized water.

Inject about 14.0 g of the above mixture into the calcium bath and maintain for 7 to 9 minutes.

Transfer to the ice water bath for 10 minutes.

Remove from the ice water bath, pat dry and place into a cup containing pasteurized egg white.

Seal, invert and refrigerate.

EXAMPLE 25

Single Extrusion

Whole poultry egg analogues are formed using a single extrusion system and the following ingredients:

| Ingredients | Quantity |
|---|---|
| Natural egg white | 237.5 g |
| Soya lecithin (Fearn Natural Foods) | 3.0 g |
| Unsalted margarine (Wilsey) | 25.0 g |
| Salted margarine (Fleischman's) | 25.0 g |
| Chicken fat | 7.5 g |
| Chicken broth (Swanson) | 20.0 ml |
| Sodium alginate (Kelgin LV) | 4.75 g |
| Lactic acid (All-World Scientific) | 1.5 g |
| Locust bean gum (Hi Tek) | 1.0 g |
| Sodium citrate | 0.75 g |

The chicken broth, reduced to about 12.0 ml, a solids content of approximately one and one-half percent (1.5%), by weight, and sodium alginate LV were alternately blended and allowed to rest for periods of about two to about three minutes—for a period of approximately ten minutes. The soy lecithin, egg white, chicken fat and margarine are then added to the chicken broth/algin mix and homogenized at high speed for about three to about five minutes so as to reduce the foaming characteristics of the mix. The lactic acid and sodium citrate are added, and the overall mix is blended for two to three minutes. Add the locust bean gum and blend the overall mix enough to get good dispersion. Add sufficient beta carotene to color the yolk/membrane analogue composition to "No. 7" on the Roche Yolk Colour Fan.

The resulting composition may be pumped through an extrusion nozzle as shown in FIGS. 3 and 4A through 4C into a first tepid setting bath maintained at a temperature ranging from about 105° F. to about 110° F., containing water and about 0.5% to 0.75%, by weight, calcium chloride. The extruded slurry is separated or pinched off by interrupter rods 58 (FIGS. 3 and 4A through 4C) into discrete globules.

The variable parameters of the single extrusion system may be adjusted to produce discrete globules weighing approximately eighteen grams each, with there being sufficient slurry to produce eighteen separate discrete globules. The globules are permitted to reside in the tepid bath for from about three minutes to about five minutes, during which period the sodium alginate LV reacted with the calcium ions present in the bath to form a thin algin matrix or membrane surrounding the liquid yolk material.

When the transitory membrane is sufficiently strong to permit handling, the discrete yolk-like spheroidal globules are transferred to a recirculating heated bath maintained at a temperature greater than 159° F. where they are permitted to reside for an additional period of from about three (3) to about five (5) minutes.

The discrete yolk analogues are then transferred to a continuously circulating tepid water rinse/set bath maintained at a temperature level ranging between about 85° F. and about 105° F. and a pH of between about 6.4 and about 6.8 and are thoroughly rinsed and excess calcium and acid were removed.

The discrete yolk/membrane analogues may be removed from the tepid rinse/set bath, rinsed with cold water at a temperature between about 45° F. and about 52° F. to further assist in removing excess calcium and acid, and transferred to a shallow rinse/set tray 32 (FIG. 2) maintained at a temperature of between about 45° F. and about 52° F. and a pH of between about 6.4 and about 6.8. After residence in the rinse/set tray 32 for from about ten (10) to about (20) minutes, during which period the yolk/membrane analogues may rest on the bottom of the shallow tray and assume a somewhat ovoid yolk shape with a flattened bottom, the discrete analogues are removed from the tray 32, again rinsed with cold water at a temperature of from about 32° F. to about 42° F., and transferred into a second rinse/firm/set tray 36 (FIG. 2) containing a cold water rinse bath maintained at a temperature of from about a cold 32° F. to about 42° F. and a pH of from about 6.3 to about 6.8 for a period of from about ten (10) minutes to about thirty (30) minutes.

The yolk/membrane analogues are surface dusted with a mixture of equal parts of HPMC and locust bean gum and then placed in natural liquid egg white contained within suitable cups—there being approximately thirty-six grams (36 gr.) of egg white material in each cup, producing a whole liquid poultry egg analogue weighing approximately fifty-four grams.

EXAMPLE 26

Dual Extrusion

A yolk formula suitable for use in preparing composite, integral whole liquid poultry egg analogues with a dual extrusion system is prepared in the following manner, utilizing the following ingredients:

| Yolk Analogue | |
|---|---|
| Chicken broth (Swanson) | 490.0 g |
| Corn oil (Staley) | 84.75 g |
| Butter essence | 1.7 g |

| Yolk Analogue | |
|---|---|
| Sodium stearoyl-2-lactylate (Mazer Chem.) | 4.0 g |
| Locust bean gum (Hi Tek) | 3.0 g |
| Soya lecithin (Central Soya) | 4.0 g |
| Carrageenan (Sea Gel) | 4.0 g |
| Xanthan (Keltrol-T) | 1.0 g |
| Pregelatinized rice flour (Riviana Foods, Inc.) | 9.0 g |

Heat the corn oil to between about 115° F. and about 125° F. Add sodium stearoyl-2-lactylate and stir into the corn oil until completely dissolved. Add the soya lecithin and butter essence and mix thoroughly. Cool the solution to about 100° F.

Heat the chicken broth separately to a temperature ranging from about 104° F. to about 112° F. Add the carrageenan and xanthan to the chicken broth and blend by a stab mixer for about five minutes, or, until the mixture is smooth and homogenous. Cool the mixture to about 100° F. Add the rice flour to the mixture and blend for about two (2) minutes until dispersed, then add the locust bean gum and briefly blend until completely dispersed.

Combine the two mixtures. Add sufficient beta-carotene to color the yolk analogue slurry to "No. 7" on a Roche Yolk Colour Fan. Cool the overall mixture to between about 30° F. and 38° F.

The resulting mixture is suitable for feeding into a conventional extrusion system employing a central extrusion nozzle of the type commonly used in forming relatively thick soft ice cream. In this instance, however, an outer annular extrusion nozzle concentric with the central nozzle is used for extruding a setable composition membrane in surrounding relation to the liquid yolk core material. Such components are extruded into a suitable setting bath.

EXAMPLE 27

Whole poultry egg analogues are formed using the procedures generally described in Example 1, but employing the following ingredients:

| Yolk Analogue | |
|---|---|
| Chicken broth | 500.0 ml |
| Gelatin (300 bloom, Hormel) | 5.5 g |
| Knox Gelatin (300 bloom) | 5.5 g |
| Sodium alginate (Gelgin HV) | 4.0 g |
| Soya lecithin (Fearn) | 3.5 g |
| Karaya gum (4-star, Colony Import) | 6.5 g |
| Unsalted margarine (Saffola) | 115.0 g |

Boil the broth down to 300.0 ml (and having a solids content of approximately 1.5 percent). Add the gelatins, and stir 2 to 3 minutes, or until the gelatin was fully dissolved. Cool the mix to a temperature of between about 85° F. and about 120° F.

When the gelatin/chicken broth mixture is cooled to approximately 100° F., add the sodium alginate HV, soybean lecithin and karaya gum and thoroughly blend into the mixture. Add the unsalted margarine and blend. Finally, add sufficient beta-carotene to color the yolk analogue slurry to "No. 7" on a Roche Yolk Colour Fan. Pour the resulting composition into rounded or tube shape molds, each containing approximately eighteen grams, and freeze to from two dozen rounded patties.

| Membrane Analogue | |
| --- | --- |
| Water | 300.0 ml |
| Locust bean gum (Hi Tek) | 9.0 g. |
| Sodium alginate (Kelgin LV) | 3.5 g |

The water, locust bean hum and sodium alginate are placed in a blender and homogenized for approximately five minutes. The resulting blended ingredients are stirred to minimize the amount of entrained air.

Coat the rounded frozen yolk patties with the liquid membrane composition and process in the same manner as example 1.

Alternatively, the yolk analogue slurry and the membrane analogue slurry may be coextruded into a suitable setting bath as described above.

Accordingly, Example 31 may be modified, and the locust bean gum is reduced from nine grams to six grams and supplemented by 1.5 g. of gum tragancanth. After prolonged storage, the thus modified whole poultry egg analogues look and handle in essentially the same manner as a natural fresh whole poultry egg. Similar results can be achieved using carrageenan, methylcellulose and/or guar gum in lieu of gum tragancanth; or, when using a protein as described in Example 28.

EXAMPLE 28

| Yolk Analogue | |
| --- | --- |
| Chicken broth (Swanson) | 500.0 ml |
| gelatin (300 Bloom Hormel) | 5.0 g |
| sodium alginate (Kelgin HV) | 4.5 g |
| karaya gum (Colony Import & Export) | 3.0 g |
| margarine (Wilsey Foods) | 115.0 g |

Reduce the chicken broth by boiling to 300 ml (having a solids content of approximately 1.5 percent). While still hot, add the gelatin to the reduced chicken broth and blend for about five minutes. Add the sodium alginate HV and karaya gum and blend for about ten to fifteen minutes. Add the margarine and blend to form a smooth homogeneous slurry. Finally, add sufficient beta-carotene to color the yolk analogue slurry to "No. 7" on a Roche Yolk Colour Fan. The resulting composition is poured into rounded or tube-shaped molds each containing approximately eighteen grams, and the material is frozen to from two dozen rounded patties.

The foregoing yolk formula of Example 32 is particularly suitable for use with the membrane described above in Example 31. Alternatively, the following membrane formulation can be used:

| Membrane Formulation | |
| --- | --- |
| Water | 300.0 ml |
| Chicken breast | 33.0 g |
| Sodium phosphate dibasic | 0.7 g |
| Ammonium hydroxide | 0.2 g |
| Sodium alginate (Kelgin LV) | 4.1 g |
| Guar gum (TIC Gums, Inc.) | 2.1 g |
| Silicone (S.A.G. 710) | qs. prn |

Blend water (100.0 ml), chicken breast, sodium phosphate dibasic and ammonium at high speed until the chicken breast is completely solubilized and reduced to a creamy consistency (approximately five minutes). During this period of time the sodium phosphate dibasic and ammonium hydroxide function as protein solubilizers for the chicken meat. [when fish protein is used, about three percent (3%) sodium chloride and one percent (1%) of a polyphosphate such as sodium phosphate dibasic are used as solubilizers]. The ammonium hydroxide also increases the pH level of the mix.

At the same time, blend water (200.0 ml) sodium alginate LV, guar gum and silicone.

When the chicken breast is reduced to a creamy consistency, add to the food processor and blend materials for an additional five minutes. Finally, add sufficient beta-carotene to color the yolk analogue slurry to "No. 7" on a Roche Yolk Colour Fan. Freeze the composition as previously described.

Dip frozen yolk patties into the membrane analogue solution. Thereafter, dip the coated yolk patties into a scalding bath maintained at a temperature of at least 180° F. for a period of from about three to about eight minutes. The bath consists of 600.0 ml of water, 4.0 g of calcium chloride, 3.0 g of lactic acid, and 1.5 g of phosphoric acid. Thereafter, the yolk/membrane analogues are dipped in a second rinse and cooling bath maintained at room temperature and containing 600.0 ml of water for a period of approximately thirty (30) seconds.

Finally remove, the yolk/membrane analogues from the second setting bath and rinse in ice cold water for about fifteen (15) minutes. Dry the yolk/membrane analogues by placing on an absorbent surface, patting and exposing to warm air. Each of yolk/membrane analogues is combined with 36.0g of liquid egg white material set forth in Example 1. The resulting composite, integral, whole poultry egg analogues are essentially indistinguishable in appearance, color, taste and other organoleptic and handling properties from a natural whole poultry eggs.

EXAMPLE 29

A membrane suitable for use with virtually any of the foregoing frozen yolk analogues is prepared in the following manner, using the following parts and ingredients:

| Part 1: | |
| --- | --- |
| water | 198.0 g |
| pepsin (1-15,000) (Schwartz Svcs, Int.) | 2.0 g |
| Part 2: | |
| dry, powdered, fat free milk and water (10% solution) (Ettlinger Corp.) | 71.2 g |
| hydrochloric acid | 0.1 g |
| lactic acid | 0.4 g |

Part 3:

Scalding bath containing an aqueous solution of 1% alum and maintained at a temperature above 159° F.

Using any of the foregoing frozen egg yolk analogues, the frozen patties are dipped into Part 1 and frozen. After freezing they are dipped into Part 2 and refrozen. These two (2) steps are repeated three or four times.

The coated frozen egg yolk analogues are dipped into Part 3, thus serving to irreversibly inactivate the pepsin and toughening the milk protein. The alum acts as a cross-linking agent. The resulting product can be frozen until combined with liquid egg white, at which point the membrane may preferably be surface dusted with a mixture of HPMC, locust bean gum, acacia gum, guar gum and/or carrageenan and combined with the liquid egg white as previously described. Alternatively, five percent (5%) HPMC, locust bean gum and/or other gums can be added to the protein solution to form a thicker membrane and reduce the need for multiple dipping.

EXAMPLE 30

Another membrane analogue that can be utilized with any of the foregoing frozen egg yolk analogues includes the following ingredients:

| Membrane Analogue | |
|---|---|
| Water | 78.0 g |
| Boiled egg whites | 120.0 g |
| ammonium hydroxide | 0.8 g |
| silicone (S.A.G. 710) | 1.35 g |

The above materials are blended for three to five minutes. After standing for five minutes, they were reblended for an additional thirty to sixty seconds.

The frozen egg yolk analogues are then dipped into the foregoing coating solution and refrozen. As the yolk and the coating thereon are refrozen, the ammonium hydroxide evaporates, setting the albumen in a membrane surrounding the yolk. Thus, the membrane contains essentially a proteinaceous hydrocoloid—viz., boiled egg white. The solubilized protein is set into a durable sac-like membrane as the ammonium hydroxide evaporates.

Alternatively, an acid component can be included in the yolk, or the coated yolk can be dipped in an acid, so that the acid component will combine and react with the ammonium hydroxide to enhance membrane formation.

While certain preferred embodiments have been described herein in detail, in the description as well as in the examples, numerous alternative embodiments are contemplated as part of the invention. Consequently, the scope of the claims is not to be limited to the specific disclosure contained herein.

What is claimed is:

1. A poultry egg yolk analogue comprising synthesized yolk material and an edible, synthesized membrane which surrounds and encapsulates said yolk material like the vitelline membrane of a natural poultry egg and forms said yolk material into a shaped resembling that of a natural egg yolk, said yolk material being thermally transformable into a substance with characteristics emulating the characteristics of a cooked natural egg yolk.

2. A poultry egg yolk analogue as defined in claim 1 in which the synthesized yolk material includes a homogeneously distributed, edible oil or animal fat.

3. The poultry egg yolk analogue of claim 2 wherein the yoke is thickened with an effective amount of a gum or gelatin.

4. The poultry egg yolk analogue of claim 2 wherein the yoke is thickened with an effective amount of a protein, lipid or polysaccharide.

5. The poultry egg yolk analogue of claim 1 wherein the synthesized egg yolk material comprises a blend of margarine and alginate gum, an amount of water effective to provide the yolk with the consistency of natural egg yolk, and effective minor amounts of coloring and flavoring.

6. The poultry egg yolk analogue of claim 1, wherein the synthesized membrane is comprised of a set hydrocolloidal gum and a protein component, and wherein the synthesized yolk material is comprised of a thickened aqueous blend of fat or oil, a reactive gum component, and minor effective amounts of flavoring and coloring.

7. The poultry egg yolk analogue of claim 6 wherein the set hydrocolloid gum comprises a crosslinked alginate.

8. A poultry egg yolk analogue comprising a shaped moiety of yolk material with characteristics emulating the characteristics of a natural egg yolk and an edible, synthesized membrane surrounding and encapsulating said yolk material like the vitelline membrane of a natural egg, said membrane comprising means for firmly adhering a natural or synthesized egg white to the membrane in a manner simulating the attachment of a natural egg white to the yolk of a natural egg, said yolk material being thermally transformable into a substance with characteristics emulating the characteristics of a cooked, natural egg.

9. The poultry egg yolk analogue of claim 8 in which the means for adhering said egg white to said membrane comprises a binding agent.

10. A poultry egg yolk analogue as defined in claim 8 in which said membrane and said egg white include albumen and the means for adhering said egg white to said membrane comprises ammonium hydroxied in an amount effective to bond albumen in said egg white to albument in said membrane.

11. A poultry egg yolk analogue as defined in claim 8 in which the means for adhering said egg white to said membrane is provided by a freeze dried outer surface layer of the membrane.

12. A poultry egg yolk analogue as defined in claim 1 or claim 8 in which the ingredient of the egg yolk material are so selected and proportioned that the consistency of said material under refrigeration approximates the consistency of a natural poultry egg yolk at the same temperature.

13. A poultry egg yolk analogue of claim 1 or claim 8 wherein the synthesized yolk material has a consistency which approximates that of natural, uncooked egg yolks.

14. A poultry egg yolk synthesized material analogue of claim 13 wherein the yolk comprises an aqueous blend of flavoring and coloring thickened to the approximate consistency of natural egg yolk.

15. The poultry yolk analogue of claim 1 or claim 8 wherein the membrane is comprised of a proteinaceous film.

16. The poultry yolk analogue of claim 1 or claim 8 wherein the membrance is comprised of a polysaccharide component.

17. A whole poultry egg analogue comprising an edible poultry egg yolk analogue as defined in claim 1 or claim 8 in combination with an egg white material selected from the group consisting of a natural poultry egg white, a treated egg white and an egg white analogue.

18. The whole poultry egg analogue of claim 17 wherein the outer surface of the edible, synthesized membrane is treated with a binding agent in an amount effective to cause the egg white material to adhere to the outer surface of said membrane.

19. The whole poultry egg analogue of claim 18 wherein the binding agent is a gum.

20. The whole poultry egg analogue of claim 19 wherein the binding agent is carageenan.

21. The whole poultry egg analogue of claim 19 wherein the binding agent is locust bean gum.

22. The whole poultry egg analogue of claim 20 wherein the binding agent is a cellulosic compound.

23. The whole poultry egg analogue of claim 22 wherein the cellulosic compound is hydroxypropylmethylcellulose.

24. A poultry egg yolk analogue as defined in claim 11 or claim 8 in which the yolk material includes means for evidencing bacterial contamination of said material.

25. A poultry egg yolk analogue as defined in claim 11 or claim 8 in which the egg yolk material includes ingredients which can be reacted to form said encapsulating membrane.

26. A whole poultry egg analogue which comprises:
an egg yolk material which characteristics which emulate the characteristics of a natural egg yolk;
an at least semitransparent egg white which can be set and made opaque by the application of heat; and
a rupture resistance membrane surrounding and encapsulating the yolk, said membrane simulating the vitelline membrane of a naturally occurring egg and having means for forming the yolk into a shape resembling that of a natural egg yolk and for attaching said egg white to said yolk;
said egg yolk material being so formulated that it does not substantially set upon the application to the egg analogue of thermal energy in an amount effective to set the egg white.

27. A whole poultry egg analogue which comprises:
an egg yolk material with characteristics which emulate the characteristics of a natural egg yolk;
an at least semitransparent egg white which can be set and made opaque by the application of heat; and
a rupture resistant membrane surrounding and encapsulating the yolk, said membrane simulating the vitelline membrane of a naturally occurring egg and having means for forming the yoke into a shape resembling that of a natural egg yolk and for attaching said egg white to said yolk;
said egg yolk material being so formulated that, when the egg analogue is cooked, said yolk material assumes a consistency similar to that of a cooked natural egg yolk.

28. An edible cooked poultry egg analogue prepared by cooking the whole egg analogue of claim 26 or claim 27 the cooked whole egg analogue having organoleptic properties approximating those of a cooked natural egg.

29. A whole poultry egg analogue of claim 26 or claim 27 wherein the membrane comprises a flexible and edible film, formed from a material selected from the group consisting of gums, protein, lipids, polysaccharides and mixtures thereof.

30. The whole poultry egg analogue of claim 26 and claim 27 wherein the membrane is formed by setting a settable aqueous composition comprising a reactive gum, said aqueous composition further including at least one ingredient selected from the group consisting of proteins, lipids and polysaccharides.

31. The whole poultry egg analogue of claim 26 or claim 27 wherein the membrane comprises a gum a polysaccharide set by a monovalent or multivalent ion to provide the membrane.

32. The whole poultry egg analogue of claim 26 or claim 27 wherein the membrane includes, as a component or adjunct, an amount of a protein, metal ion, or gum effective to promote adherence between the egg white and the synthesized membrane.

33. The whole poultry egg analogue according to claim 26 or claim 27 wherein the membrane is comprised of a set hydrocolloid gum and a protein component selected from the group consisting of albumin, natural egg white, sol utilized meat proteins and mixtures thereof.

34. The whole poultry egg analogue according to claim 33 wherein the set hydrocolloid gum is an alginate set by ionic calcium.

35. The whole poultry egg analogue of claim 26 or claim 27 wherein the egg yolk material comprises an aqueous blent of flavoring and thickener so formulated as to provide the egg yolk analogue when cooked with the organoleptic properties of an unhardened cooked natural egg yolk.

36. The whole poultry egg analogue of claim 35 wherein the yolk material comprises an aqueous blent of a fat or oil, minor effective amounts of flavoring and coloring, and a thickener.

37. The whole poultry egg analogue of claim 36 wherein the thickener is an alginate gum.

38. The whole egg analogue of claim 36 wherein the membrane material comprises hydroxypropylmethylcellulose.

39. A method of making an edible poultry egg yolk analogue which comprises the steps of:
blending together the components of a synthesized, egg yolk material with characteristics emulating the characteristics of natural egg yolk and so formulated that, upon the application of heat, said material will assume the consistency of a cooked natural poultry egg yolk and have characteristics emulating the characteristics of cooked natural egg yolk;
providing a membrane material which can be converted to a edible, synthesized membrane with characteristics emulating the characteristics of the vitelline membrane of a natural poultry egg;
forming a moiety of the egg yolk material into a shape resembling the shape of a natural egg yolk;
encapsulating the moiety of egg yolk material in said membrane material; and
then converting said membrane material to a vitelline membrane-emulating synthesized membrane.

40. A method as defined in claim 39 in which the constituents of the membrane material are blended with the components of the egg yolk material.

41. A method as defined in claim 39 in which:
the shaped moiety of egg yolk material is frozen to immobilize it in the egg yolk-like shape; and
it is the shaped and frozen moiety of egg yolk material that is encapsulated in the membrane forming material; and
the shaped, frozen, and encapsulated moiety is then contact with means for converting the membrane forming material into the synthesized membrane.

42. A method as defined in claim 39 which includes the step of applying to the encapsulating membrane material a binding agent capable of bunching and firmly adhering egg white to the membrane into which the membrane forming material is converted.

43. A method as defined in claim 39 in which the membrane-encapsulated yolk material is placed in a setting bath with a sufficiently high calcium ion content to produce an egg yolk analogue which, upon cooking, is similar to a cooked natural egg yolk.

44. A method as defined in claim 39 in which:

said egg yolk analogues are formed and encapsulated by coextruding the egg yolk material and the membrane forming material with the latter surrounding the egg yolk material; and the coextrusion is so divided into moieties that the end of each moiety exposed by that dividing is coated with the membrane forming material as the moieties are released from the coextrusion.

45. A method as defined in claim 39 in which the membrane forming material is so formulated that it can be converted to a membrane which is impervious.

46. A method as defined in claim 39 in which:

a major constituent of the membrane forming material is a cross-linkable, matrix forming alginate;

the membrane forming material is converted to a membrane by effecting cross-linking of the alginate and the formation of an alginate-containing matrix; and an effective amount of a constituent capable of strengthening the alginate-containing matrix is included in the membrane forming material.

47. A method as defined in claim 39 in which the moiety of egg yolk material is formed by providing a flowing stream of the egg yolk material and so interrupting the flow as to separate a discrete moiety of the egg yolk material from said stream.

48. A method as defined in claim 47 in which:

the stream of egg yolk material is discharged through the outlet of a deformable nozzle; and the flow of egg yolk material is interrupted by so deforming said nozzle as to close said outlet.

49. A method of making a whole poultry egg analogue which comprises the step of surrounding with and bonding to the yolk material-encapsulating membrane of an egg yolk analogue prepared by the method defined in claim 39 one of the group consisting of natural poultry egg whites, treated egg whites, and synthesized egg white analogues.

50. The method of claim 39 wherein the membrane forming component comprises an alginate settable by treatment with a solution containing metal ions to form a flexible, edible membrane as aforesaid.

51. The method of claim 39, wherein the yolk material is comprised of an aqueous blend of thickener, an oil or fat, and minor effective amount of coloring and flavoring and is so formulated as to provide a yolk having the consistency of natural egg yolk; and wherein the membrane forming material is comprised of gum and protein.

52. The method of claim 39 wherein the membrane forming material is converted to a membrane by treating the membrane forming material in a setting bath so formulated and under conditions effective to impart a generally ovoid shape to the encapsulated yolk material.

53. The method of claim 39 wherein the membrane forming material is settable by reaction with calcium ions to convert said material to a membrane in a bath containing a calcium salt in an amount ranging from about 0.1 to about 10 percent.

54. The method of claim 53 wherein the bath further contains an edible acid in an amount sufficient to render the pH of said bath about 6.2 to about 6.8.

* * * * *